(12) United States Patent
Onyon et al.

(10) Patent No.: US 9,432,439 B1
(45) Date of Patent: Aug. 30, 2016

(54) SYSTEM FOR AND METHOD OF BACKING UP CONTENT FOR USE ON A MOBILE DEVICE

(75) Inventors: Richard Onyon, San Jose, CA (US); Liam Stannard, San Jose, CA (US); Leighton Ridgard, San Jose, CA (US); Robert E. Garner, Lawrenceville, GA (US)

(73) Assignee: Synchronoss Technologies, Inc., Bridgewater, NJ (US)

( * ) Notice: Subject to any disclaimer, the term of this patent is extended or adjusted under 35 U.S.C. 154(b) by 0 days.

(21) Appl. No.: 13/479,216

(22) Filed: May 23, 2012

Related U.S. Application Data

(62) Division of application No. 12/011,399, filed on Jan. 25, 2008.

(60) Provisional application No. 60/897,789, filed on Jan. 26, 2007, provisional application No. 60/937,314, filed on Jun. 26, 2007.

(51) Int. Cl.
  *H04M 3/00* (2006.01)
  *H04L 29/08* (2006.01)
  *H04W 4/00* (2009.01)
  (Continued)

(52) U.S. Cl.
  CPC .......... *H04L 67/04* (2013.01); *H04L 67/2823* (2013.01); *H04L 65/4084* (2013.01); *H04W 4/003* (2013.01); *H04W 4/18* (2013.01)

(58) Field of Classification Search
  CPC ....... H04W 4/02; H04W 4/003; H04W 4/18; H04L 29/08657; H04L 67/04; H04L 65/4084; H04L 67/1095; H04L 67/02; H04L 67/306; H04L 65/60; H04L 12/189; H04L 67/28; H04L 67/303

USPC .......................... 455/414.1–414.4, 418, 419
See application file for complete search history.

(56) References Cited

U.S. PATENT DOCUMENTS

| 5,204,902 | A | 4/1993 | Reeds et al. |
| 5,509,070 | A | 4/1996 | Schull |
| 5,801,699 | A | 9/1998 | Hocker et al. |

(Continued)

FOREIGN PATENT DOCUMENTS

EP    1804418    4/2007

OTHER PUBLICATIONS

Office Action dated May 26, 2013, U.S. Appl. No. 12/011,399, filed Jan. 25, 2008.

(Continued)

*Primary Examiner* — Olumide T Ajibade Akonai
(74) *Attorney, Agent, or Firm* — Synchronoss Technologies, Inc.; Frederick W. Dour

(57) ABSTRACT

In accordance with the invention, mobile phones and other electronic devices access content through links, rather than storing the content on the mobile phone or at a location under the control of a mobile phone operator. A user retrieves the content by accessing a link on the mobile phone, which results in transferring the content from a content-provider location directly to the mobile phone. In this way, the mobile phone operator does not have to reserve storage for the content, and the content provider, alerted that the user is restoring or otherwise requesting content, is able to offer the user upgrades, replacement content, and related content. To better offer a user relevant content, a history of purchases for the mobile phone, the user, or both is maintained.

35 Claims, 18 Drawing Sheets

(51) Int. Cl.
  *H04W 4/18* (2009.01)
  *H04L 29/06* (2006.01)

(56) References Cited

U.S. PATENT DOCUMENTS

| | | | |
|---|---|---|---|
| 5,828,376 A | 10/1998 | Solimene et al. | |
| 5,909,568 A | 6/1999 | Nason | |
| 5,930,350 A | 7/1999 | Johnson | |
| 5,950,193 A | 9/1999 | Kulkarni | |
| 5,966,717 A | 10/1999 | Sass | |
| 6,023,620 A * | 2/2000 | Hansson | 455/419 |
| 6,061,063 A | 5/2000 | Wagner et al. | |
| 6,067,582 A | 5/2000 | Smith et al. | |
| 6,430,289 B1 | 8/2002 | Liffick | |
| 6,549,937 B1 | 4/2003 | Auerbach et al. | |
| 6,574,744 B1 | 6/2003 | Kantz et al. | |
| 6,601,071 B1 | 7/2003 | Bowker et al. | |
| 6,668,254 B2 | 12/2003 | Matson et al. | |
| 6,684,088 B1 | 1/2004 | Halahmi | |
| 6,718,336 B1 | 4/2004 | Saffer et al. | |
| 6,734,883 B1 | 5/2004 | Wynn et al. | |
| 6,990,187 B2 | 1/2006 | MacNamara et al. | |
| 7,159,036 B2 | 1/2007 | Hinchliffe et al. | |
| 7,308,651 B2 | 12/2007 | Kling et al. | |
| 7,337,229 B2 | 2/2008 | Dutta et al. | |
| 7,519,766 B2 | 4/2009 | Schafer | |
| 8,010,095 B2 | 8/2011 | Natsuno et al. | |
| 8,073,954 B1 | 12/2011 | Tu et al. | |
| 8,224,308 B1 * | 7/2012 | Gavrylyako et al. | 455/418 |
| 8,612,590 B1 | 12/2013 | Chaddha et al. | |
| 2001/0005849 A1 | 6/2001 | Boothby et al. | |
| 2001/0044838 A1 * | 11/2001 | Iida | 709/219 |
| 2002/0072350 A1 | 6/2002 | Fukuzato | |
| 2002/0087588 A1 | 7/2002 | McBride et al. | |
| 2002/0104097 A1 * | 8/2002 | Jerding et al. | 725/115 |
| 2002/0118192 A1 | 8/2002 | Couckuyt et al. | |
| 2002/0129047 A1 | 9/2002 | Cane et al. | |
| 2002/0152318 A1 * | 10/2002 | Menon | G06F 17/30899 709/231 |
| 2003/0043195 A1 | 3/2003 | Kling et al. | |
| 2003/0110280 A1 * | 6/2003 | Hinchliffe et al. | 709/232 |
| 2003/0154171 A1 | 8/2003 | Karp et al. | |
| 2003/0158960 A1 | 8/2003 | Engberg | |
| 2003/0163483 A1 | 8/2003 | Zingher et al. | |
| 2003/0200023 A1 | 10/2003 | Matsushita et al. | |
| 2003/0208480 A1 | 11/2003 | Faulkner et al. | |
| 2003/0217181 A1 | 11/2003 | Kiiskinen | |
| 2003/0229723 A1 | 12/2003 | Kangas et al. | |
| 2003/0233418 A1 | 12/2003 | Goldman | |
| 2003/0236933 A1 | 12/2003 | Shigeta et al. | |
| 2004/0003390 A1 | 1/2004 | Canter et al. | |
| 2004/0110497 A1 | 6/2004 | Little | |
| 2004/0174965 A1 | 9/2004 | Brahm et al. | |
| 2004/0210752 A1 | 10/2004 | Rao | |
| 2004/0243994 A1 * | 12/2004 | Nasu | 717/171 |
| 2004/0267676 A1 | 12/2004 | Feng et al. | |
| 2005/0050117 A1 | 3/2005 | Seo et al. | |
| 2005/0055309 A1 * | 3/2005 | Williams | G06Q 30/02 705/40 |
| 2005/0102329 A1 * | 5/2005 | Jiang et al. | 707/204 |
| 2005/0114470 A1 * | 5/2005 | Bal | 709/219 |
| 2005/0143111 A1 | 6/2005 | Fitzpatrick et al. | |
| 2005/0164651 A1 | 7/2005 | Ollis et al. | |
| 2005/0177419 A1 * | 8/2005 | Choi et al. | 705/14 |
| 2005/0191998 A1 | 9/2005 | Onyon et al. | |
| 2005/0233800 A1 | 10/2005 | Jones | |
| 2005/0268107 A1 | 12/2005 | Harris et al. | |
| 2005/0283741 A1 | 12/2005 | Balabanovic et al. | |
| 2006/0056606 A1 | 3/2006 | Bocking et al. | |
| 2006/0148418 A1 | 7/2006 | Purkayastha et al. | |
| 2006/0148477 A1 | 7/2006 | Reilly | |
| 2006/0195474 A1 | 8/2006 | Cadiz et al. | |
| 2006/0199599 A1 * | 9/2006 | Gupta et al. | 455/466 |
| 2006/0206709 A1 | 9/2006 | Labrou et al. | |
| 2006/0268842 A1 | 11/2006 | Takahashi et al. | |
| 2006/0277160 A1 | 12/2006 | Singh et al. | |
| 2007/0005504 A1 | 1/2007 | Chen et al. | |
| 2007/0016796 A1 | 1/2007 | Singhal | |
| 2007/0022469 A1 | 1/2007 | Cooper et al. | |
| 2007/0047523 A1 | 3/2007 | Jiang | |
| 2007/0127597 A1 | 6/2007 | Ammer et al. | |
| 2007/0173236 A1 | 7/2007 | Vishwanathan et al. | |
| 2007/0180468 A1 * | 8/2007 | Gill et al. | 725/45 |
| 2007/0190983 A1 | 8/2007 | Goldfarb et al. | |
| 2007/0214264 A1 | 9/2007 | Koister | |
| 2007/0226199 A1 | 9/2007 | Moore et al. | |
| 2007/0226783 A1 | 9/2007 | Mimlitsch | |
| 2008/0005080 A1 | 1/2008 | Xiques et al. | |
| 2008/0027826 A1 | 1/2008 | Popick et al. | |
| 2008/0051071 A1 * | 2/2008 | Vishwanathan et al. | 455/414.1 |
| 2008/0051117 A1 | 2/2008 | Khare et al. | |
| 2008/0104442 A1 | 5/2008 | Diao et al. | |
| 2008/0109881 A1 | 5/2008 | Dasdan | |
| 2008/0120199 A1 | 5/2008 | Pirnack et al. | |
| 2008/0208617 A1 | 8/2008 | Onyon et al. | |
| 2008/0214167 A1 * | 9/2008 | Natsuno et al. | 455/414.3 |
| 2008/0270805 A1 | 10/2008 | Kean | |
| 2009/0029685 A1 * | 1/2009 | Willis | 455/414.1 |
| 2009/0143052 A1 | 6/2009 | Bates et al. | |
| 2009/0183091 A1 | 7/2009 | Sharpe et al. | |
| 2009/0254560 A1 | 10/2009 | Klein et al. | |
| 2009/0287921 A1 | 11/2009 | Zhu et al. | |
| 2009/0307486 A1 | 12/2009 | Grajek et al. | |
| 2010/0057777 A1 | 3/2010 | Williamson | |
| 2010/0095238 A1 | 4/2010 | Baudet | |
| 2010/0100945 A1 | 4/2010 | Ozzie et al. | |
| 2010/0205448 A1 | 8/2010 | Tarhan et al. | |
| 2010/0241857 A1 | 9/2010 | Okude et al. | |
| 2011/0107203 A1 | 5/2011 | Nash et al. | |
| 2011/0131237 A1 * | 6/2011 | Macaluso | G06F 8/63 707/769 |
| 2011/0145099 A1 | 6/2011 | Berger et al. | |
| 2011/0269424 A1 | 11/2011 | Multer et al. | |
| 2012/0151346 A1 | 6/2012 | McClements, IV | |

OTHER PUBLICATIONS

Office Action mailed Dec. 31, 2012, U.S. Appl. No. 12/011,399, filed Jan. 25, 2008, Richard Onyon et al.

Office Action mailed on Sep. 19, 2013, U.S. Appl. No. 12/011,399, filed Jan. 25, 2008, Richard Onyon et al.

Steffan Hallsteinsen et al., Using the Mobile Phone as a Security Token for Unified Authentication, in Second International Conference on Systems and Networks Communication (2007).

Padwick and Ray, Using Microsoft Outlook 98, 1998.

Handy Address Book website as it appeared on Dec. 8, 2003 and Dec. 12, 2003 and was stored by the Internet Archive, retrieved on Aug. 8, 2014, retrieved from the Internet <URL: "https://web.archive.org/web20031208113634/http://www.beiley.com/haboo/index.html" et al.>.

Handy Address Book Documentation as it appeared on Jun. 3, 2004 and was stored by the Internet Archive, retrieved on Aug. 8, 2014, retried from the Internet: <URL: https://web.archive.org/web/20040603075016/http://www.beiley.com/habook/help/documentation.htm>.

Screenshots taken from the Handy Address Book software on Aug. 25, 2014.

How-To Geek, Convert a Row to a Column in Excel the Easy Way, retrieved on Feb. 8, 2015, retrieved from the Internet at URL: <http://www.howtogeek.com/howto/12366/convert-a-row-to-a-column-in-excel-the-easy-way/>.

Office Action dated Oct. 16, 2014, U.S. Appl. No. 12/011,399, filed Jan. 25, 2008.

gma, Using Microsoft Outlook 2000 for Contact Management, Active Technologies [online], [submitted by gma on Jan. 22, 2012] Retrieved from the Internet <URL: http://active-technologies.com/content/using-microsoft-outlook-2000-contact-management>.

Bob Temple, the Complete Idiot's Guide to Microsoft Outlook 2000, Que, A division of Macmillian Computer Publishing, 1999, pp. 158-167.

* cited by examiner

|  |  |  |
|---|---|---|
| 15555551212<br>691A | Joe Smith<br>691B | Address@domain.com<br>691C |
| Tetris<br>692A | 3.0<br>692B | Phone Maker 1<br>692C |
| Chess Game<br>693A | 1.0<br>693B | Phone Maker 1<br>693C |
| Train Schedule<br>694A | 3.0<br>694B | Phone Maker 1<br>694C |

Fig. 13

SYSTEM FOR AND METHOD OF BACKING UP CONTENT FOR USE ON A MOBILE DEVICE

RELATED APPLICATIONS

This application is a Divisional Application which claims priority under 35 U.S.C. 121 of the co-pending U.S. patent application Ser. No. 12/011,399, filed Jan. 25, 2008, entitled "SYSTEM FOR AND METHOD OF BACKING UP CONTENT FOR USE ON A MOBILE DEVICE" which in turn claims priority under 35 U.S.C. §119(e) of both the U.S. provisional patent application Ser. No. 60/897,789, filed Jan. 26, 2007, and titled "CONTENT LOCKER, APPLICATION AND CONTENT BACKUP," and the U.S. provisional patent application Ser. No. 60/937,314, filed Jun. 26, 2007, and titled "CONTENT LOCKER, APPLICATION AND CONTENT BACKUP," all of which are hereby incorporated by reference in their entireties.

FIELD OF THE INVENTION

This invention is related to transmitting content to electronic devices. More specifically, this invention is related to systems for and methods of restoring content, updating content, storing equivalent content, and offering content for mobile devices such as mobile phones.

BACKGROUND OF THE INVENTION

Mobile phones and other electronic devices contain ever increasing content, with upgrades, equivalents, and other content created for them each year. Mobile phones, for example, store address books, user-generated content such as digital images, and third-party content such as ringtones, wallpaper, and music files, to name only a few types of content. Content is not easily restored when the phone is deactivated. It is difficult for a user to remember what content was stored on the phone, the correct version of the content for a particular phone, or even where she acquired the content. Even if she can discover all this information, the process of restoring content to the phone is still time-consuming, error prone, and tedious.

When restoring content to a phone, the user is also unaware of upgrades to content. Unknown to the user, a content provider may have released a new version of content or an equivalent, more popular version. The user misses an opportunity to get upgraded, more desirable content, and the content provider misses an opportunity to sell, license, or offer a subscription to new content.

Users face these same problems when upgrading to a new phone or other device. The new phone may require different versions of content: a simple transfer of content from the old to the new mobile phone will not work.

SUMMARY OF THE INVENTION

In a first aspect of the present invention, a method of providing content to a mobile device includes determining a source of the content (e.g., a content provider) and transmitting the content from the source to a storage location accessible to the mobile device, such as directly on the mobile device. Preferably, the content is transmitted wirelessly. Mobile devices include, but are not limited to, mobile telephones, personal digital assistants, and personal computers. Content includes, but is not limited to, a mobile application program, a mobile ring tone, a mobile wallpaper, video data, audio data, a digital image, a ring back tone, or a combination of these.

In one embodiment, the method also includes storing on the mobile device a selectable link for accessing the content on the storage location and storing data that associates the source with the content, the mobile device, or both. This data is used to determine what content has been acquired for the mobile device and the source (e.g., one or more content providers) that can be accessed to retrieve the content. The data includes a pathname to the source, such as one containing a Uniform Resource Locator, and identifiers for the content itself. The data is parsed to determine the source and the content. Preferably, the data is stored on a system remote from the mobile device, so that when the mobile device retrieves the content it contacts the system, which communicates with the source to transmit the content to the mobile device.

In one embodiment, the source is determined by querying one or more locations for the content, such as third-party content providers. The content providers respond by transmitting the content (e.g., wirelessly) to the mobile device. In one embodiment, a single aggregation interface is used to automatically retrieve content from multiple sources.

In a second aspect of the present invention, a method of accessing content from a device includes selecting on the device a link to content stored on a storage system and automatically receiving the content on the device in response to selecting the link. The storage system is remote to the device and when the link is selected, a copy of the content is transmitted from the storage system to the device.

Preferably, the content is accessed by determining that the content is not stored on the storage system and then receiving the content on the storage system. As one example, content is determined to be on the storage system using a hash. A list containing the hash for each content on the storage system is maintained. If it is determined that a hash for desired content is not in the list, it is determined that the content is not on the storage system and must be retrieved from a content provider.

In a third aspect of the present invention, a method of offering content for a first device includes storing a history of acquisitions associated with one or more entities and displaying on the first device offers for content based on the history. The one or more entities correspond to a user, to a mobile device, or to both. In other words, offers can be based on what was acquired for a particular mobile phone, for a particular user, or both. The offers are for purchasing, subscribing to, licensing, upgrading, or replacing content, or any combination of these.

Content is updated, in part, by transcoding or resizing using content in the history. In one embodiment, the method also includes automatically receiving replacement or updated content on the first device. Preferably, the history is stored at a content provider location but can be stored at other locations.

In one embodiment, the method also includes polling the content provider location for an acquisition associated with the one or more entities, automatically receiving notification from the content provider location of an acquisition for the one or more entities, storing metadata about content acquired by the one or more entities, or any combination of these. The metadata includes a name for content, a description of content, a size of content, a format of content, an encoding of content, an author of content, or any combination of these. The history includes a count of license usages.

In a fourth aspect of the present invention, a method of offering content for a device includes displaying a first list of content acquired for one or more entities and transmitting one or more items in the first list to a first mobile device. Preferably, from this first list, one or more of the items are selected for storing on the device.

In one embodiment, the first list is automatically transmitted to the first mobile device. The first list is displayed, and one or more items are selected from it and transmitted to the first mobile device from a location remote to the first mobile device. The method also includes selecting a second list of mobile devices and transmitting the one or more items to the mobile devices in the second list. The first list is generated from a history of acquisitions associated with a second mobile device.

In a fifth aspect of the present invention, a method of configuring a device includes constructing from a first device a link to content on a storage system and storing the link on a second device. Thus, the second device is configured to access the same content available to the first device. Preferably, storing the link includes storing the content and data for selecting the content. The link, the content, or both are wirelessly transmitted from the storage system to the second device during an initial configuration of the second device. Alternatively, the link, the content, or both are stored on the second device at predetermined time intervals.

In a sixth aspect of the present invention, a mobile device includes a client module containing a link and programmed to access content using the link, preferably wirelessly. The client module is programmed to display icons for selecting replacement content for replacing content acquired for the mobile device. The replacement content includes an upgrade to content acquired for the mobile device or a different version of the content acquired for the mobile device.

In a seventh aspect of the present invention, a content management system for a mobile device includes a first content module containing content and a delivery interface programmed to transfer content from the content module to a mobile device. The delivery interface is programmed to transfer content from the content module to a mobile device using a link to the content accessible to the mobile device.

The system also includes a data store of acquired content, a replacement module for mapping acquired content to replacement content, and an interface programmed to receive content from one or more sources and to poll the one or more sources to determine content acquired from the one or more sources. The interface includes a connection module for connecting to sources using Uniform Resource Indicators to the one or more sources. In one embodiment, the system also includes a parser for parsing the content to thereby determine the one or more sources. Preferably, the one or more sources are third-party sources.

In one embodiment, the system also includes an offer module for generating offers for replacement content on the mobile device. The offer module is programmed to transmit data associated with the offers to the mobile device and the mobile device is programmed to display and select the offers. The offer module is also programmed to generate the offers from a history of acquisitions for one or more entities such as users or mobile phones.

Preferably, the system also includes a metadata store containing metadata about content. Metadata includes information indicating a manufacturer of a mobile device, a version of a mobile device, operating capabilities of a mobile device, or any combination of these. The operating capabilities include a screen size, a number of pixels, or both.

In one embodiment, the system also includes a Web-based interface coupled to the content manager and programmed to manage the content, a multimedia content data store, a user-generated content data store, and an application data store.

BRIEF DESCRIPTION OF THE DRAWINGS

FIG. 13 shows user data stored at a content provider in accordance with one embodiment of the present invention.

DETAILED DESCRIPTION OF THE PREFERRED EMBODIMENT

Embodiments of the present invention are directed to restoring, updating, and offering content on electronic devices, such as mobile telephones, personal digital assistants, personal computers, and the like.

Different embodiments of the present invention are able to restore content to an electronic device in different ways. In one embodiment, a link to content is stored on a mobile phone, allowing the mobile phone to automatically access multiple content stored at one or more remote (e.g., third-party) locations. In this way, content is accessed and stored on the mobile phone only when needed, thus using memory on the mobile phone more efficiently.

Other embodiments ensure continued access to subscribed content, even when the mobile phone is deactivated. For example, when a mobile phone is deactivated and then reactivated, or when service to one mobile phone is migrated to another mobile phone, the user is able to seamlessly restore access to the subscribed content.

Other embodiments allow a user to substitute content on a mobile device. As one example, when a mobile phone is reactivated, the mobile phone is restored with an upgrade of content previously stored on the mobile phone or its equivalent. The content provider thus increases its opportunities to sell to customers content or subscriptions to content, and gives customers opportunities to get the latest version of content.

In general, the present invention ensures the integrity of customer purchase data, restores already purchased content when a handset is restored, provides customers the opportunity to upgrade applications previously stored on a handset, conserves bandwidth since content is transferred only when restored on a handset, and allows users to transfer content, upgrades, or equivalent content on new handsets. Content includes, but is not limited to, address book contact data, user-generated pictures and sound recordings, ringtones, wallpapers, and videos purchased or subscribed from third-party content provides, and Binary Runtime Environment for Wireless (BREW) applications purchased through a Content Provider BREW mobile shop.

Figure 1:
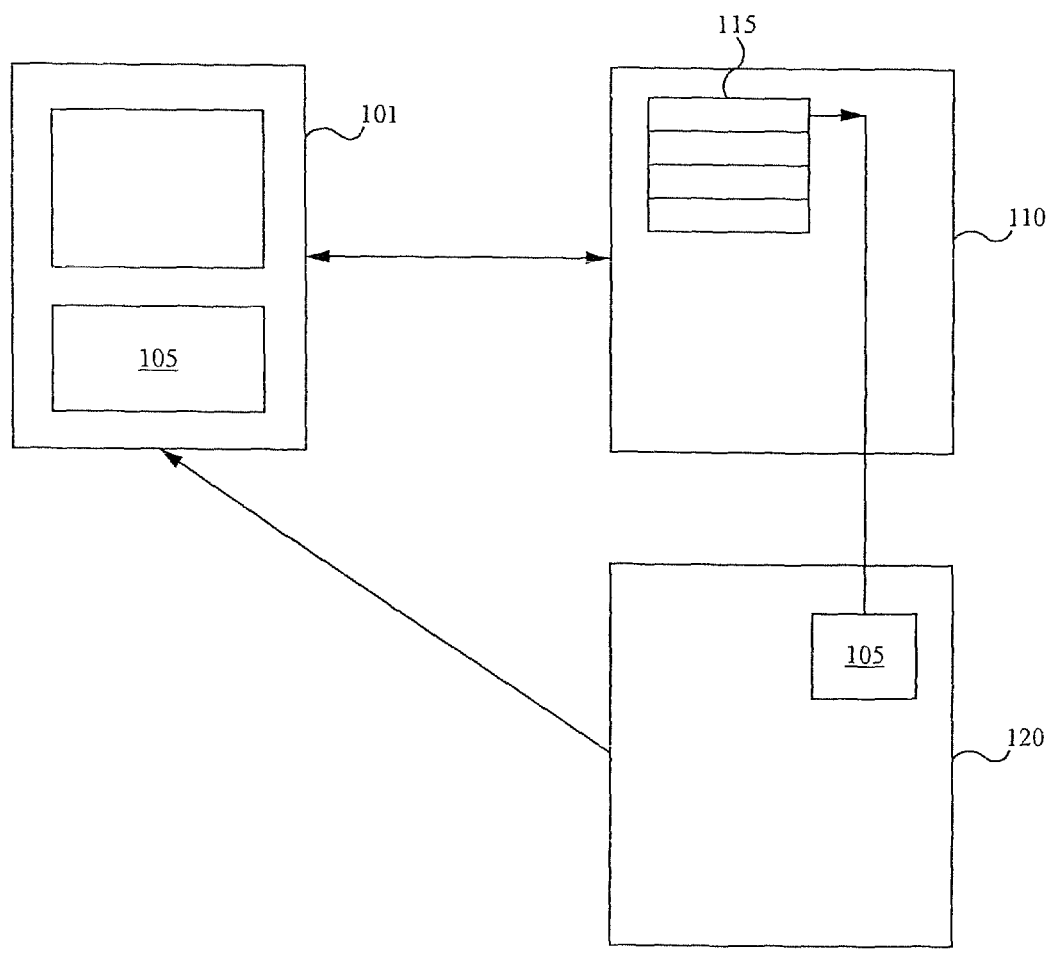
FIG. 1 shows a mobile phone, a platform for restoring content, and a content provider in accordance with one embodiment of the present invention.

FIG. 1 is a high-level diagram of components of a system in accordance with one embodiment of the present invention. The system includes a mobile phone 101 coupled to an intermediate platform 110, which in turn is coupled to a content provider 120. The mobile phone 101 contains both user-generated and other content 105, such as ringtones, calendars, video images, audio data, wallpaper, etc. The platform 110 stores a user record 115 that contains a link to the content 105 at a content provider 120. When the mobile device 101 must restore content 105, such as when it is reactivated or initialized, it notifies the platform 110. The platform 110 contacts the content provider 120, identifying the mobile phone 101 and, using the link to the content 105, the content 105. The content provider 120 then transmits the content 105 to the mobile phone 101, which restores the content 105.

During device set up, a user purchases or otherwise acquires content for the mobile phone 101. When the purchase is made, the user record 115 is added to the platform 110, and the content provider 120 records that the user (identified, for example, by the telephone number of the mobile phone) has purchased the content. Any license usage counts are initialized at this stage, so that the user is able to retrieve the content 105 only the allowed number of times. An icon is stored on the mobile phone 101 to access the platform 110 and thus ultimately the content provider 120, as described herein.

Advantageously, the mobile phone 101 and the platform 110 do not require extra storage for the content 105, storing only links to it. Preferably, content is stored at a content provider, from which the content is retrieved. This structure allows the content provider to keep track of and notify the user that updates and equivalent content, which are generally under the control of the content provider, are available. The content provider 120 is also able to substitute equivalent or updated content when available. In alternative embodiments, the content 105 is stored on the platform 110, from where it is transmitted to the mobile phone 101.

Figure 2:
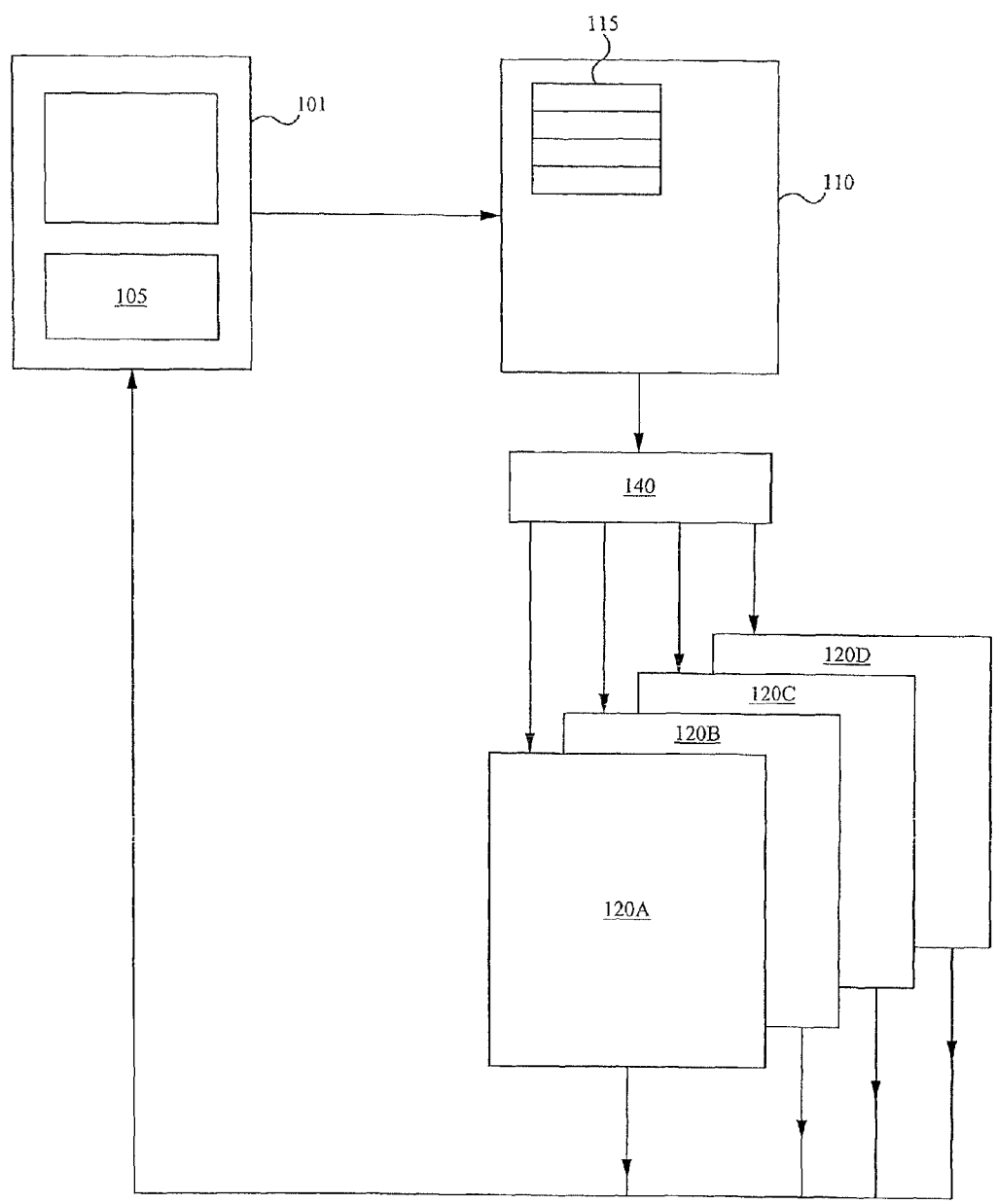
FIG. 2 shows a mobile phone, a platform for restoring content, and multiple content providers in accordance with one embodiment of the present invention.

While FIG. 1 shows the mobile device 101 and platform 110 coupled to a single content provider, it will be appreciated that the mobile device 101 is able to contain content acquired from and thus to be restored by multiple content providers. Thus, FIG. 2 shows a system in which the mobile device 101 and platform 110 are both coupled to multiple content providers 120A-D, which all function similarly to the content provider 120 in FIG. 1. It will also be appreciated that while FIG. 1 shows a single user record 115, the platform 110 will generally store multiple user records, for multiple users.

Preferably, the platform 110 is coupled to the multiple content providers 120A-D through an aggregator 140, which receives a request for content from the platform 110 and routes the request to the appropriate one of the multiple content providers 120A-D containing the content sought. Alternatively, the aggregator 140 queries all content providers 120A-D, and the one content provider hosting the content sought transmits it to the mobile phone 101. In a preferred embodiment, the aggregator 140 is part of the platform 110; in an alternative embodiment, the aggregator 140 and the platform 110 are separate components.

It will be appreciated that although FIGS. 1 and 2 show lines directly connecting the components (e.g., directly connecting the mobile device 101 to the platform 110), the components are preferably coupled over a wireless network, or are coupled over a wide area network such as the Internet, over a local area network, or any combination of these.

Figure 3:
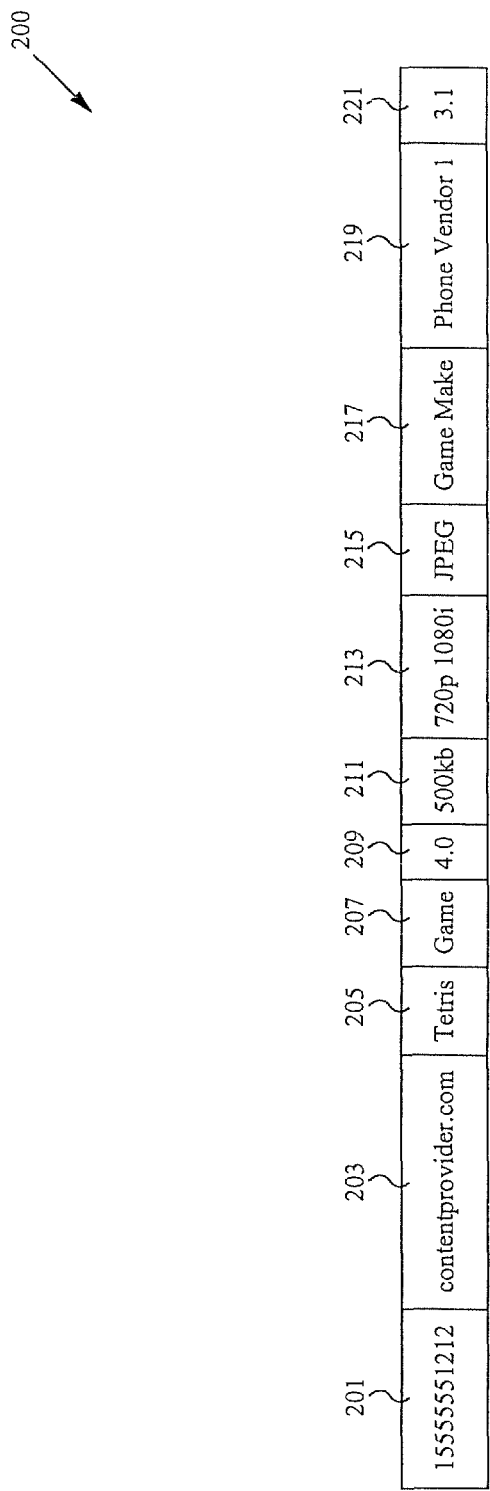
FIG. 3 shows metadata stored on the platform in FIGS. 1 and 2 and used to locate and restore content in accordance with the present invention.

FIG. 3 shows the user record 115 according to one embodiment of the present invention. The user record 115 contains an identifier of the mobile phone 201 (the phone number, 15555551212), a uniform resource locator (URL) of the content provider 203 (contentprovider.com), a name of the content 205 (Tetris), a classifier of the content 207 (game), a version number of the content 209 (4.0), a size of the content 211 (500 kB), a format for displaying the content on the mobile device 213 (720p 1080i), an encoding scheme for the content (JPEG) 215, an author of the content 217 (GameMaker), an identifier of the mobile phone 219 (PhoneVendor1), and a model of the mobile phone 221 (3.1). Those skilled in the art will recognize that the user record 115 is able to contain other metadata, a subset of the metadata shown in FIG. 3, or any combination of metadata suitable for identifying the content and communicating with the content provider 120 to transmit the content to the mobile phone 101. In operation, the platform 110 parses the user record 115 to determine the source (e.g., URL 203) of the content provider from which the content is retrieved for storing on the mobile device 101.

Figure 4:
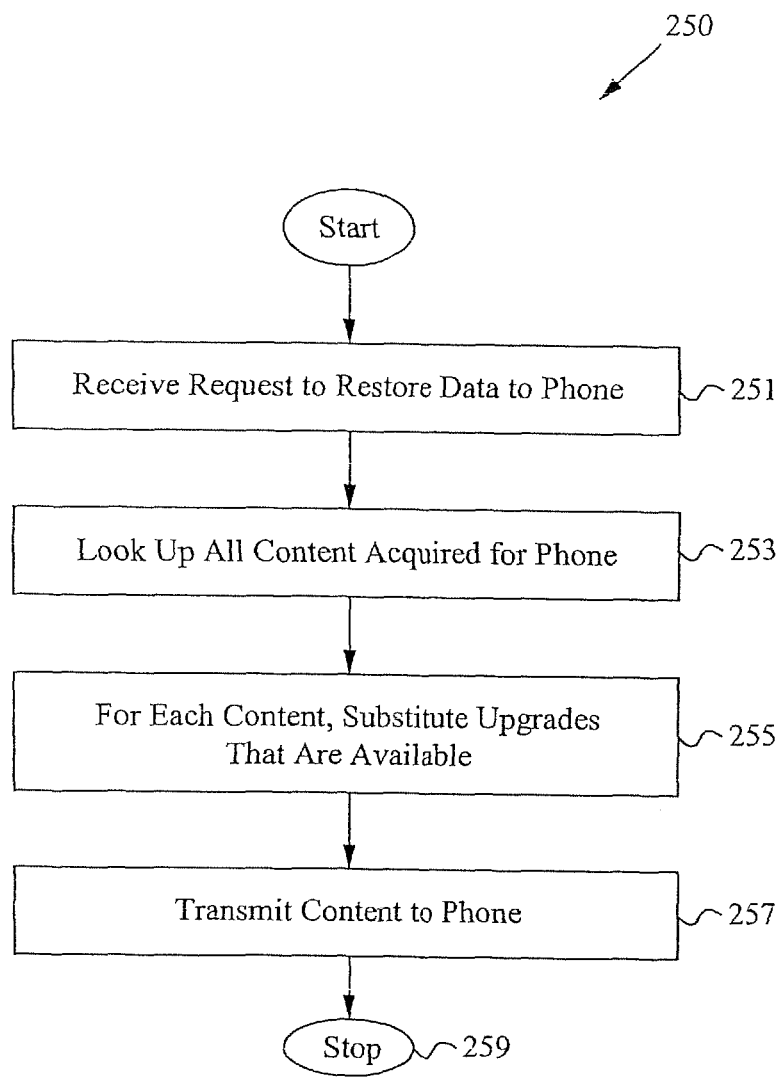
FIG. 4 is a flowchart showing the steps in a process for restoring content to a mobile phone in accordance with one embodiment of the present invention.

As discussed above, in one embodiment, the aggregator 140 of FIG. 2 polls the content provider locations 120A-D to determine whether they contain content to be restored to the mobile phone 101. FIG. 4 shows the steps 250 that each content provider location 120A-D takes in response to the polling. Referring to the exemplary content provider location 120A, first, in the step 251, the content provider 120A receives a request to restore content to the mobile phone 101. Preferably, the request includes the telephone number of the mobile phone 101; alternatively, the request includes some other identifier of the mobile phone 101 or some identifier of the user of the mobile phone. In the step 253, the content provider 120A looks up all the content that has been acquired for the mobile phone 101. In the step 255, the content provider 120A determines whether any upgrades are available for the acquired content and substitutes upgrades when available. In the step 257, the content provider 120A transmits the content (including upgrades, if available) to the mobile phone 101. The process ends in the step 259. It will be appreciated that new content may be resized, reformatted, or otherwise changed to ensure that it performs or is displayed properly on the mobile device 101.

Figure 5:
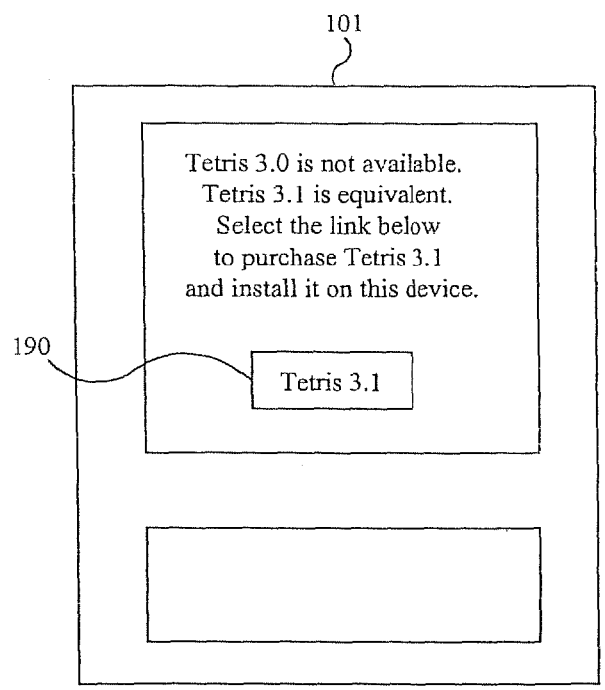
FIG. 5 shows a display on a mobile device, allowing a user to store equivalent content on the mobile device in accordance with one embodiment of the present invention.

In other embodiments, discussed below, if neither previously acquired content nor an upgrade is available, equivalent content is transmitted to the mobile phone 101 in the step 257. In still other embodiments, the user of the mobile phone is given the option of acquiring an upgrade or equivalent content. FIG. 5 shows the mobile device 101, with a display offering content equivalent to what was previously acquired for the mobile device 101 (Tetras 3.1) and a selectable link 190 for acquiring the equivalent content.

Figure 6:
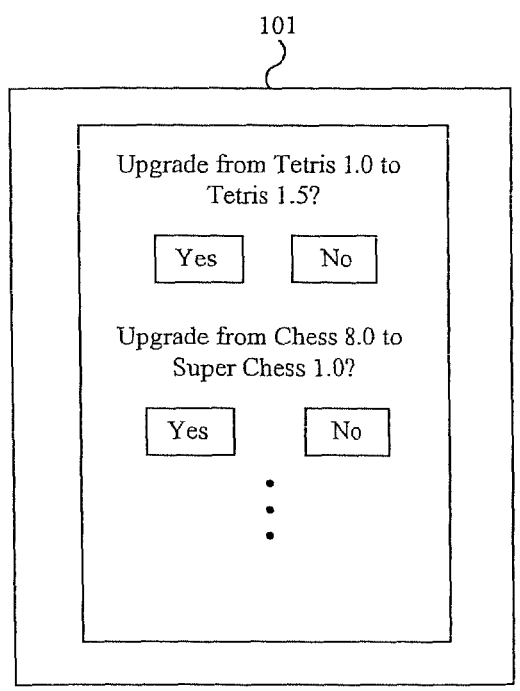
FIG. 6 shows a display on a mobile device, allowing a user to upgrade content on the mobile device in accordance with one embodiment of the present invention.

FIG. 6 shows the mobile phone 101 offering a list of upgrades, which the user has the option of accepting or declining.

Figure 7:
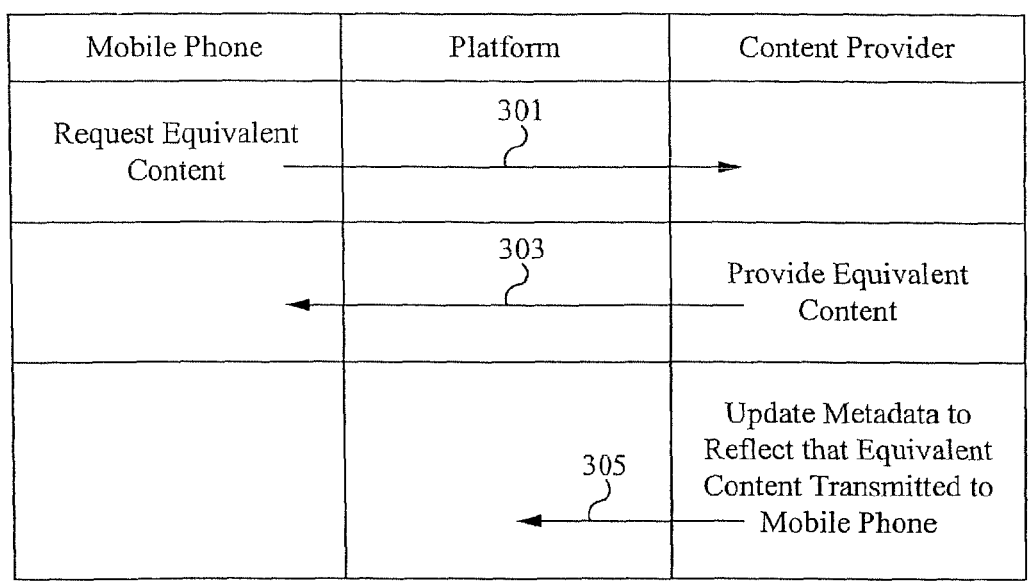
FIG. 7 is a sequence diagram showing the steps for acquiring equivalent content in accordance with one embodiment of the present invention.

FIG. 7 is a sequence diagram 300 showing user data (e.g., metadata) on the platform 110, updated when equivalent (or upgraded) content is transmitted to the mobile phone 101. Preferably, the user is presented on the mobile phone 101 with a list from which she can select equivalent content. After selecting equivalent content, in the step 301, the mobile phone 101 transmits to the content provider 120 a request for particular equivalent content. In the step 303, the content provider 120 transmits the equivalent content to the mobile phone 101. In the step 305, the content provider 305 transmits information (e.g., metadata) to the platform 110 to reflect that the mobile phone 101 has now acquired the equivalent content (e.g., the previously acquired content has been replaced). The user record (FIG. 3) is then updated to reflect that equivalent content has been acquired.

The system must ensure that equivalent or other replacement content is selected so that it is compatible with the mobile device. Thus equivalent content must be selected so that its binary, image size and device form factor, and its encoding format are all suitable for the mobile device. To this end, content providers (or intermediate platforms) maintain mapping databases that map content suitable for one device to content suitable for another device.

Preferably, a history of purchases, subscriptions, and other acquisitions are generated for the mobile phone 101. As discussed below, this history is used to determine upgrades or equivalent content for the content acquired for the mobile phone 101. Based on this history, the user of the mobile phone 101 is offered upgrades and equivalent content for content previously acquired for the mobile phone 101, as well as offers for content similar or related to previously purchased content.

Figure 8A:
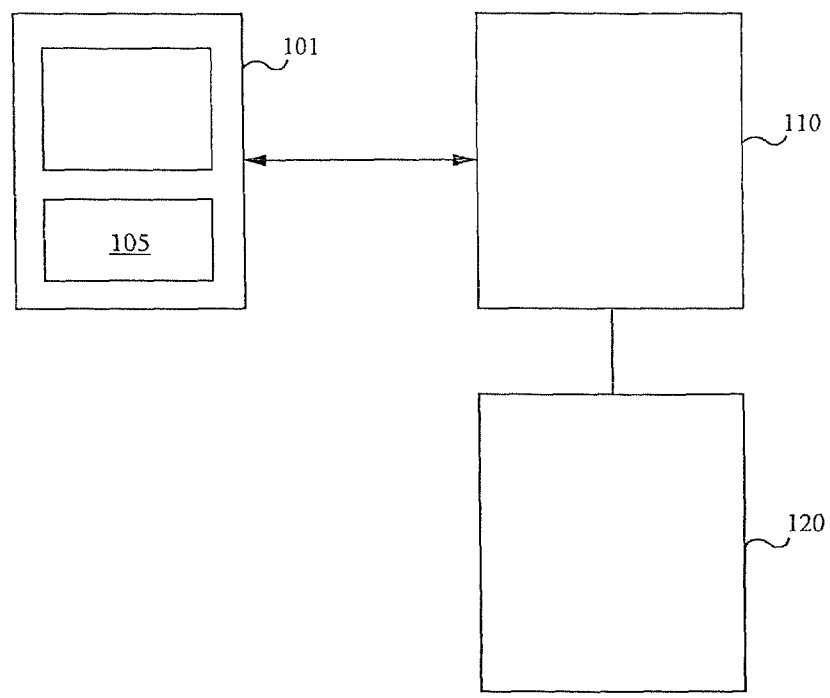
FIGS. 8A and 8B show transferring links to content from one mobile phone to another in accordance with one embodiment of the present invention.
Figure 8B:
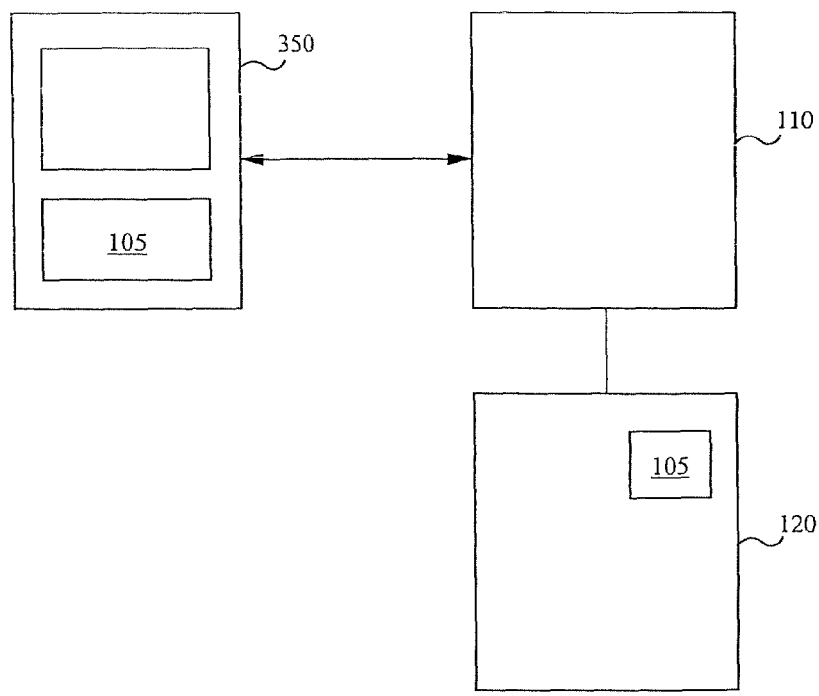

It will be appreciated that embodiments of the present invention are able to be used, not only to restore content to a mobile phone, but also to migrate content from one mobile phone to another. Thus, for example, a user may upgrade his mobile phone and wishes to transfer content from the mobile phone to a new one. FIG. 8A shows mobile phone 101 coupled to the platform 110, which in turn is coupled to the content provider 120. FIG. 8B shows a mobile phone 350, an upgrade of the mobile phone 101, coupled to the platform 110 and the content provider 120. In one embodiment, when the mobile phone 350 is first activated, it automatically communicates with the platform 120. The platform 120 is programmed to recognize that the mobile phone 350 is an upgrade of the mobile phone 101 and performs the steps of "restoring" content previously acquired for the mobile phone 101 to the mobile phone 350, such as described above. This may occur because, for example, the mobile phone 350 is given the same phone number as the mobile phone 101. Alternatively, the user of the mobile phone 350 identifies herself to the platform 110 and initiates "restoration" of content, such as described above.

Figure 9:
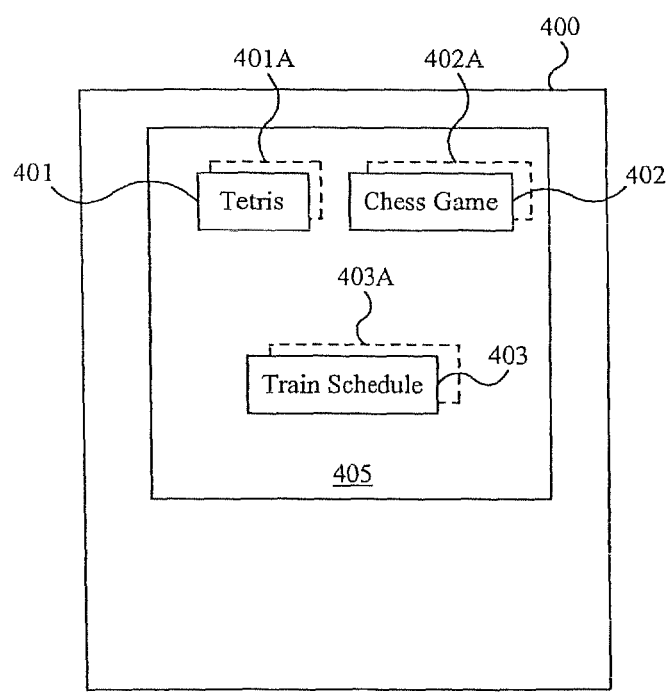
FIG. 9 shows a display on a mobile phone and icons of different content and the corresponding links for acquiring the content in accordance with one embodiment of the present invention.

In still other embodiments of the invention, a mobile phone is programmed to store content efficiently. In one embodiment, rather than store links to content on a remote platform (e.g., platform 110, FIG. 1), the mobile phone itself stores links to content. Preferably, the content is accessed using one or more icons displayed on the mobile phone. FIG. 9 shows a mobile phone 400 in accordance with one embodiment of the invention. The mobile phone 400 includes a display screen 405 showing icons 401 (Tetris), 402 (Chess game), and 403 (Train schedule). Each icon 401-403 has an associated link, 401A-403A, respectively, such that when one of the icons 401-403 is selected, its associated link is accessed, thereby connecting the mobile device 400 to a content provider associated with the selected content (e.g., a third-party content provider) to trigger the content provider to download the content to the mobile phone 400.

As one example, the link 401A associated with the icon 401 is the URL, contentprovider.com/tertris/4.0/15555551212, which contains the Web address of the content provider (contentprovider.com), the name of the content to be retrieved (Tetris), the version of the content (4.0), and the phone number of the mobile phone (5555551212). When contacted, the content provider parses this URL, determines what content to store on the mobile phone 400, and then, using the phone number of the mobile phone, transmits the content to the mobile phone 400. Preferably, once the content is no longer used on the mobile phone 400 (e.g., the application is closed), it is removed from the mobile phone 400. In this way, because the mobile phone 400 does not persistently maintain all the content it has access to, it can access content larger than its available memory.

In an alternative embodiment, once the content is retrieved from the content provider, it is stored on both the mobile phone 400 and on an intermediate storage location. In this way, any future retrieval of the content (which may be deleted on the mobile phone after use) is from the intermediate storage location, which functions as a proxy server. In this embodiment, the link 401A is updated to refer to the intermediate storage location.

In one embodiment, the content is not automatically deleted from the mobile phone after it is used. Instead, the content is removed manually and remains of the mobile device for future use. Again using the icon 401 and its associated link as an example, when the icon 401 is selected, the mobile device 400 is programmed to first determine whether the associated content is available on the mobile phone 400. Preferably, the mobile phone 400 stores a hash of the content as part of the metadata about the content. The mobile phone 400 compares this hash against the hashes of all other content stored on the mobile phone 400. If the mobile phone 400 determines that it does not contain the content, it will retrieve the content from the content provider, as described above. Alternatively, the content is stored on an intermediate platform, which stores and uses a hash to determine available content in a similar manner.

It will be appreciated that features of each embodiments described in this application can be used on other embodiments. For example, the link 401A is able to include metadata similar to the metadata 200, which also contains an address of a third-party content provider (element 203). Similarly, when updating or changing mobile phones, the icons 401-403 and associated links 401A-403A are all able to be transferred to the new mobile phone. This may occur during an initial configuration of the new mobile phone.

Use Case Diagrams

Figure 10:
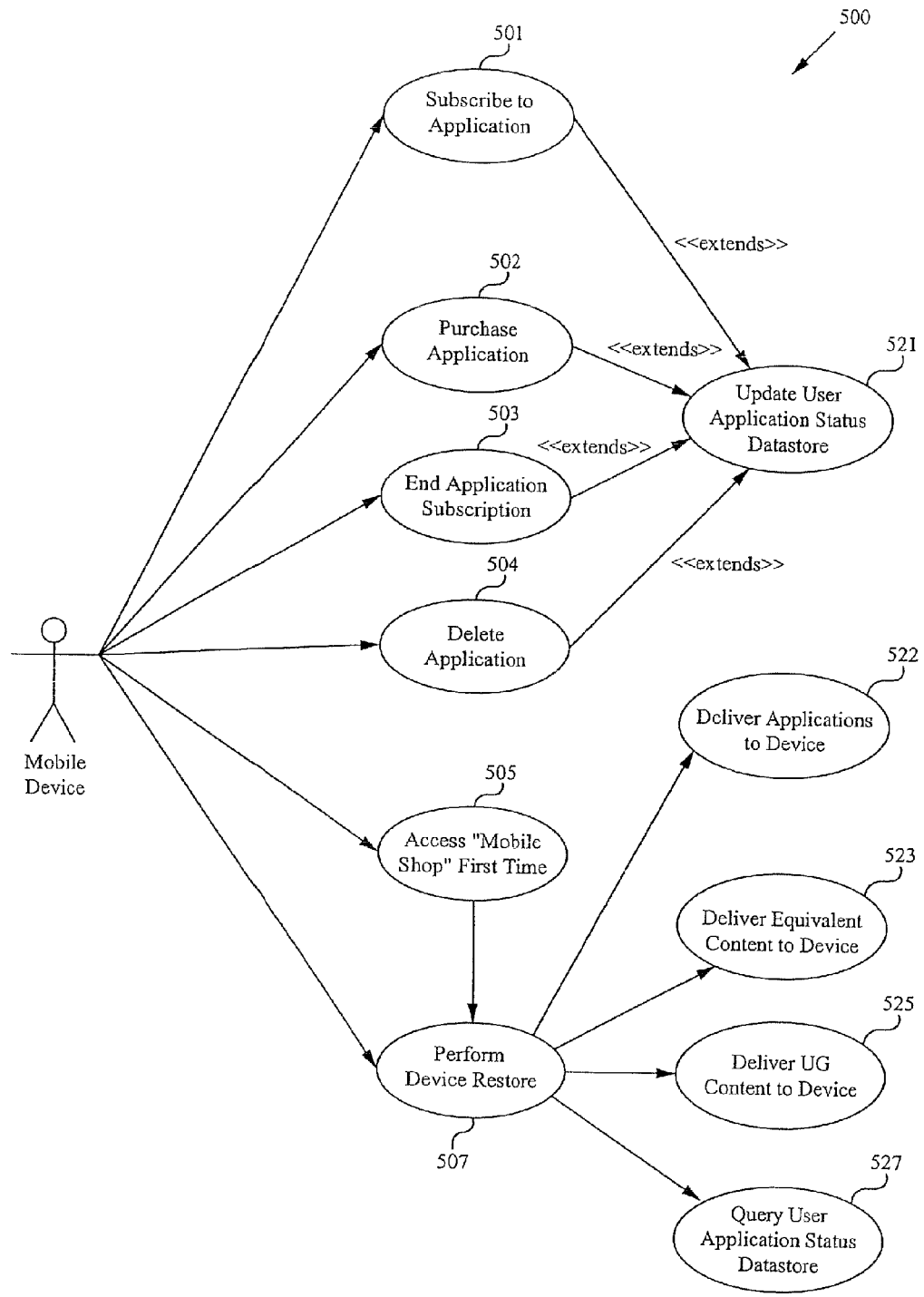
FIG. 10 is a use-case diagram for restoring/acquiring content in accordance with one embodiment of the present invention.
Figure 11:
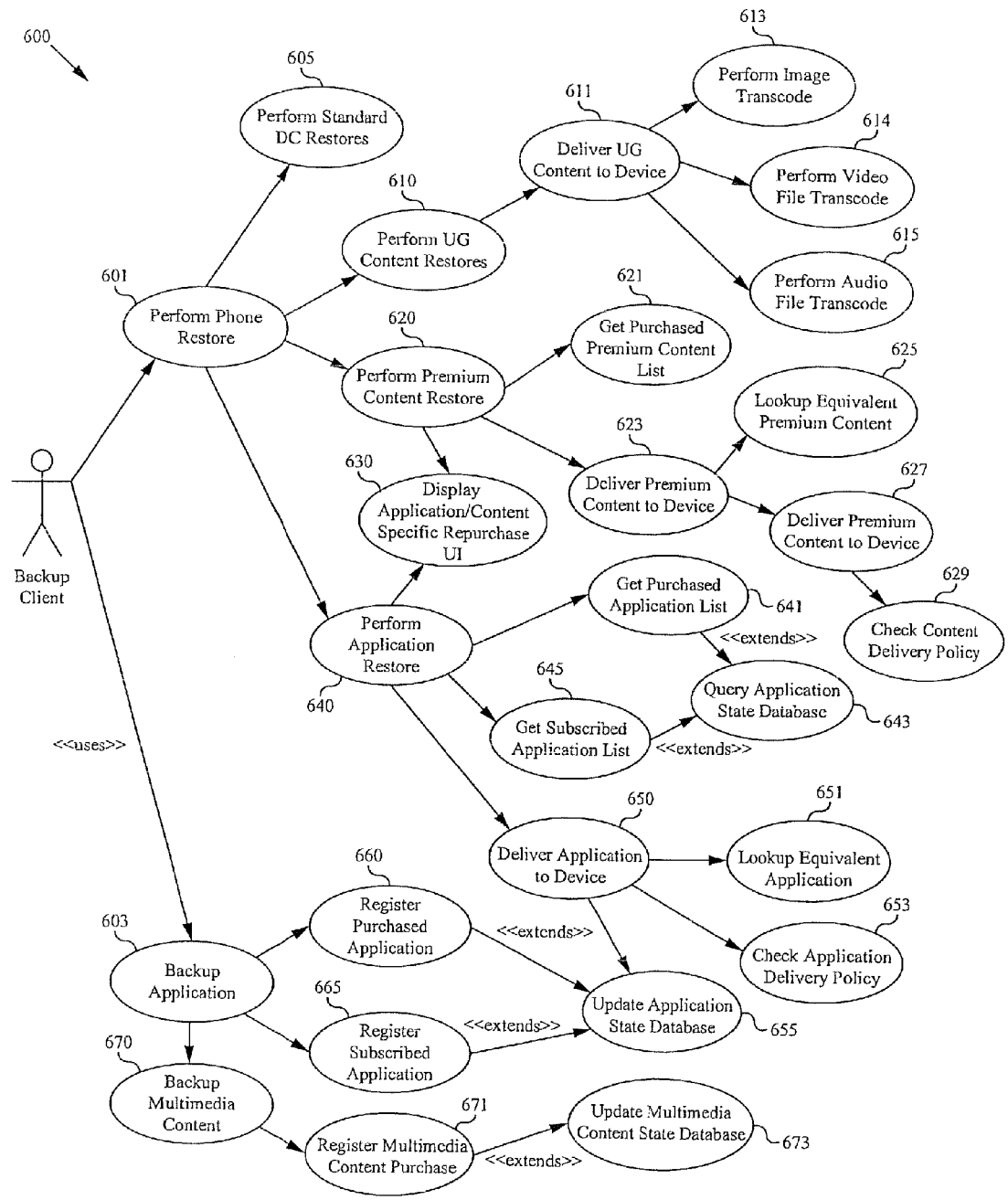
FIG. 11 is a use-case diagram for backing up content in accordance with one embodiment of the present invention.

FIGS. 10 and 11 are use-case diagrams 500 and 600, respectively, used to model backing up and restoring content in accordance with embodiments of the present invention. The use-case diagrams shown in this application use the well-known labels "uses," "extends," and "includes." To make the diagrams more readable, cases that use the relationship "uses" are left unlabeled.

Referring to FIG. 10, a mobile device is able to subscribe to an application 501, purchase an application 502, end an application subscription 503, delete an application 504, access a "mobile shop" for the first time 505, and perform a device restore 507. All of the cases 501-504 are able to be extended to update a user application status datastore 521. The case of performing a device restore is also able to deliver applications to the device 521, deliver equivalent content to the device 523, deliver user-generated (UG) content to the device 525, and query a user application status datastore 527. From the case of accessing a mobile shop for the first time 505, the system is also able to perform device restore 507.

As illustrated in FIG. 10, any application or content purchase or subscription is reported to and maintained in the backup system datastores. When a restore is initiated, the subscribed applications, application settings, purchased multimedia content, and user-generated content are restored to the mobile device, as described herein.

One popular trigger for a mobile device restore is the initiation of the on-device mobile shop. The mobile shop application can be configured to launch the restore process when it is launched for the first time on a device. Alternatively, a stub application may be preloaded onto the device. The stub application will launch shortly after the mobile phone is activated and provisioned and will prompt the user to restore applications and purchased content.

Any business logic desired may be implemented in the client: application or content-specific rules may be applied and an appropriate user interface displayed to the user. Examples of these rules and user-interfaces include automatic no-fee download and installation of subscription-based applications, reduced-fee "repurchases" prompt for pay-per-download applications and content, no-fee download of operator-determined number of previously purchased ringtones, special reduced fees for particular previously purchased ringtones, reminders about previously downloaded but deleted applications, offers to continue previously initiated but subsequently canceled application subscriptions, and simple reminders (or recommended alternative applications) detailing what content the user had previously.

FIG. 11 is a high-level use case diagram 600 for application and content backup and restore. As shown in the use-case diagram 600, a client is able to restore a phone 601 and backup an application 603. A phone can be restored by restoring standard data 605, restoring user-generated content 610, restoring premium content 620, and restoring applications 640. User-generated content 610 can be restored by delivering user-generated content to a device, which in turn performs image transcoding 613, video file transcoding 614, and audio file transcoding 615.

Premium content is restored 620 by getting a purchase premium content list 621, delivering premium content to the device 623, and displaying application and content specific repurchase user interface 630. Premium content is delivered to the device 623 by looking up equivalent premium content 625 and delivering premium content to the device 627. Premium content is delivered to the device 627 by checking a content delivery policy 629.

An application is restored 640 by displaying an application and content specific repurchase user interface 630, getting a purchased application list 641, getting a subscribed application list 645, and delivering the application to the device 650. Both the cases of getting a purchased application list 641 and getting a subscribed application list 645 are extended by querying the application state database 643.

Applications are delivered to a device 650 by looking up equivalent applications 651, checking the application delivery policy 653, and updating the application state database 655.

An application is backed up 603 by registering a purchased application 660, registering a subscribed application 665, and backing up multimedia content 670. A purchased application is registered 660 and a subscribed application is registered 665 by updating the application state database 655. Multimedia content is backed up 670 by registering multimedia content purchase, which is extended by updating the multimedia content state database 673.

Figure 12:
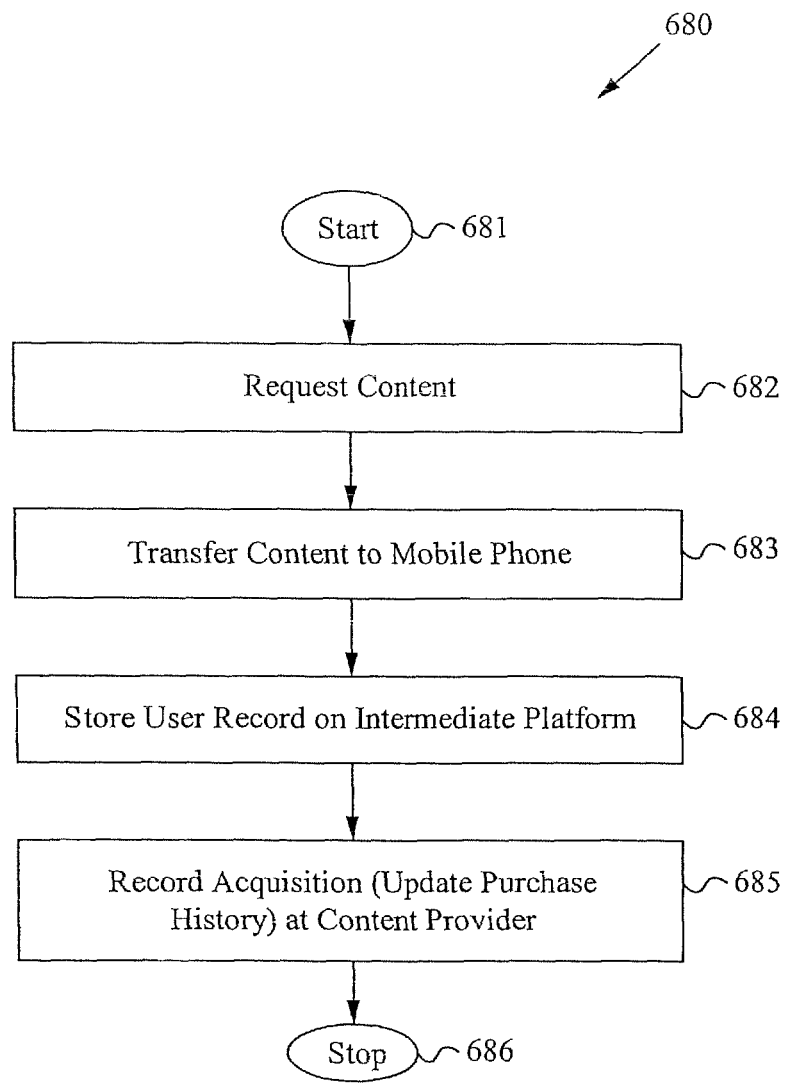
FIG. 12 shows the steps of purchasing content, transferring content, storing information for restoring content in accordance with one embodiment of the present invention.

FIG. 12 shows the steps 680 of a process for acquiring content (e.g., purchase, license, etc.) for a mobile phone in accordance with one embodiment of the present invention. Referring to FIGS. 1 and 12, the process starts in the step 681, and in the step 682, the content is requested. In the step 683, the content is transferred from the content provider 120 to the mobile phone 101. In the step 684, the user record 115 is stored on the intermediate platform 110. In the step 685, the content provider 120 records the acquisition (along with other acquisitions for the mobile phone 101), used to later restore the mobile phone 101. In one embodiment, the acquisition is recorded in an acquisition table, such as shown in FIG. 13. The process ends in the step 686.

FIG. 13 shows an "acquisition table" 690 maintained at the content provider 120 in accordance with one embodiment of the present invention The acquisition table 690 contains a history of a user's past acquisitions for the mobile phone 101. Individual purchases are stored in individual records of the acquisition table 690. When the content provider 120 is later polled, the acquisition table 690 can be used to determine what content the content provider 120 provided to the mobile phone 101, and thus what content (or equivalents or upgrades) is to be restored to the mobile phone 101.

The acquisition table 690 includes rows 691-694. The row (also referred to as a "record") 691 is used, among other things, to identify the mobile phone 101. The record 691 contains a telephone number 691A (15555551212) of the mobile phone 101, a name (e.g., owner) 691B associated with the mobile phone ("Joe Smith"), and an Internet address 691C associated with the mobile phone "Address@domain.com"). The telephone number 691A, the Internet address 691C, or both can be used to transmit content to the mobile phone 101 in accordance with the present invention.

The records 692-694 all contain information about previously acquired content. For example, the record 692 indicates that the game Tetris (692A), version 3.0 (692B), for the phone brand Phonemaker1 (692C) was acquired for the mobile phone 101. Thus, for example, when Tetris 3.0 is purchased for the mobile phone 101, the record 692 is added to the acquisition table 690. In a similar manner, the record 693 indicates that Chessgame (693A), version 1.0 (693B), for the phone brand Phonemaker1 (693C) was acquired; and the record 694 indicates that the application "Train schedule" (694A), version 3.0 (694B), for the phone brand Phonemaker1 (694C), was also acquired.

It will be appreciated that the acquisition table 690 is only illustrative. Those skilled in the art will recognize that acquisition tables containing other information can also be used in accordance with the present invention.

Hardware Components

FIGS. 14-17 show components used to implement embodiments of the present invention. Some of these components are described below.

Backup Client

The backup client is preloaded on the mobile device and is programmed to implement the client-side business logic required for an application and content backup and restore system. The client's primary function is to present a user interface to the user which allows the user to backup content on the device, and in the case of a device migration or new device, retrieve the content to the new device.

Content Delivery Interface

This is a server-side interface that provides programmed retrieval of the applications and premium content from a server-side database. Preferably, HTTP with a simple protocol encoded in it is used. The interface may also use opaque tokens, such as used with the Application/Multimedia Purchase and Restore Manager. Preferably, this interface is also programmed to parse metadata to determine the source of content.

Application/Multimedia Purchase and Restore Manager

This manager interfaces with the application billing system to determine which applications a user has purchased, subscribed to, or both, what equivalent application is appropriate for a given device, and a mechanism to push that application to the backup client. Preferably, this manager generates data for offers of new content from user purchase histories and transmits these offers to the backup client. Preferably, the Restore Manager communicates with the mobile phone using a wireless protocol such as Wireless Application Protocol (WAP).

Equivalent Application Mapping Datastore

An extended version of the currently available datastore, which shows which applications supersede existing applications, and which application binary is appropriate for a given mobile device. Preferably, the mapping database is populated by entries from the content providers when they submit content for inclusion on the application/content catalog and may be updated as new versions of applications are provided for new platforms.

"Equivalent" Mapping Datastores

These databases map from a particular piece of content (e.g., "Who Let the Dogs Out" ringtone) to a number of platform-specific formats. The mapping datastore is utilized by the portability interface to report which instance of a piece of content is appropriate for a given platform. Preferably, if a piece of content is not available for a given platform, the mapping datastore recommends a substitute content instance, if appropriate.

User Generated Content and Application Settings Datastore

Content and application providers provide and maintain mapping and equivalence databases, which contain information allowing the client to retrieve the device-appropriate version of an application or premium content. These datastores are queried at restore time before downloading an application or instance of premium content.

Premium Content Portability Interface

This is the third-party implementation of a specified interface that allows the synchronization platform to determine which of the third-party's content a given user has purchased, metadata about the content in question (e.g., ringtone title and description), which equivalent content should be provided to the device, and a URL that the synchronization platform can access to retrieve the content from the third party.

Synchronization Server Platform Components

When contacted by the backup client at restore time, the synchronization server connects to each third-party content provider and queries its content portability interface to determine which content belonging to the provider should be restored to the handset. The appropriate content is retrieved over the same interface and provided to the backup client, which installs it on the handset to complete the restore process.

The synchronization server provides a standardized interface to Web sites (such as an operator's customer-facing Web sites), which enables the Web site to provide information and actionable interfaces pertaining to the user's content.

Third-Party Mapping Interface

This layer is a conduit that connects to each of the third-party content suppliers and uses their interfaces to implement the business logic in accordance with the present invention. This layer is also able to poll content providers to determine what content was provided to a particular user or mobile phone.

User Purchase History Directory

The content provider purchase history databases are populated by queries by the server-side components in the course of determining which applications may be offered to a user when restoring to the new device.

Figure 14:
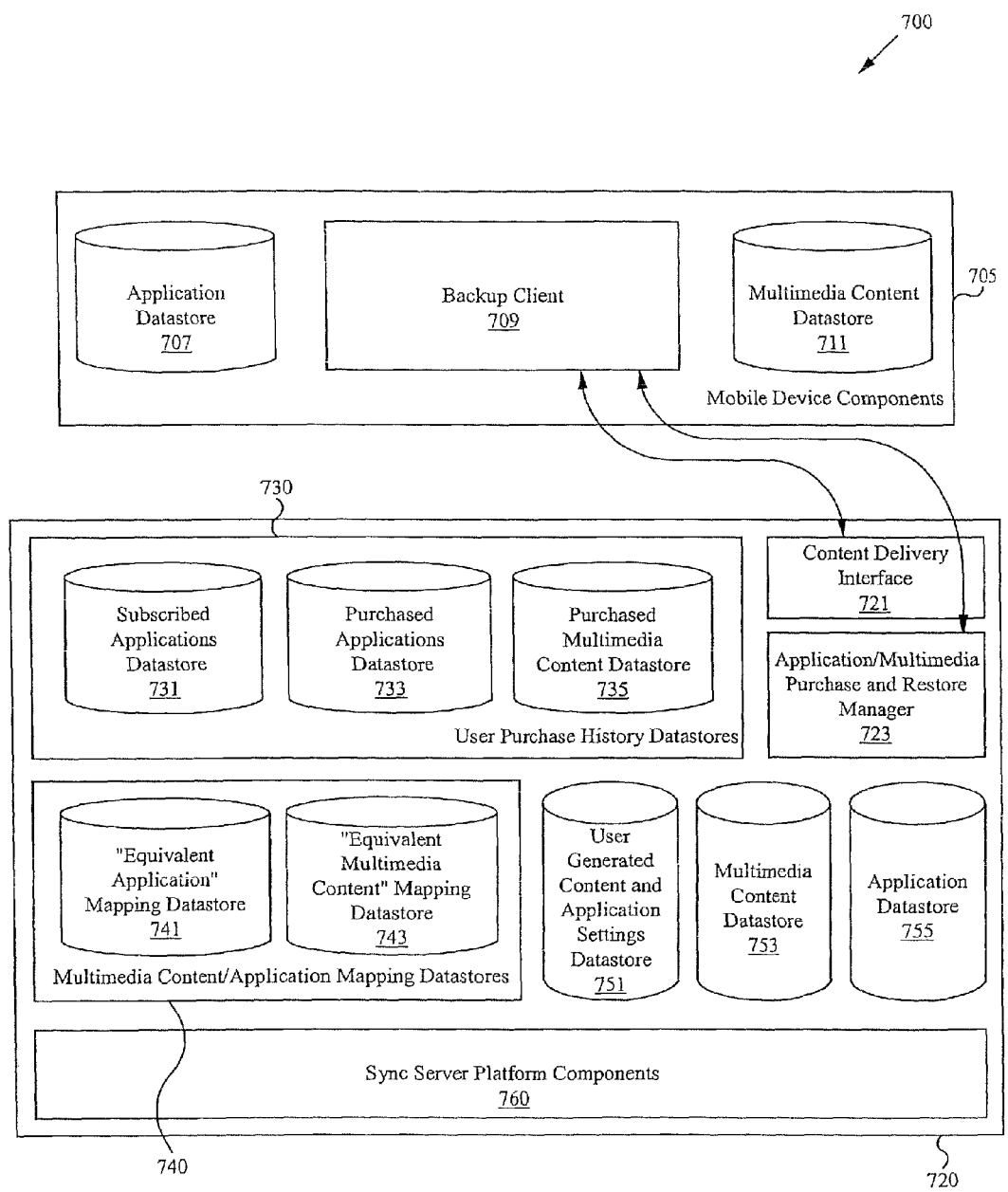
FIGS. 14-17 show components for acquiring, backing up, and restoring content in accordance with embodiments of the present invention.

FIG. 14 is a block diagram of a backup and restore system 700 in accordance with one embodiment of the present invention. The system 700 allows an operator or original device manufacturer (ODM) the ability to maintain control of the applications and multimedia content and its delivery system, while relying on the synchronization server to handle the details of what is installed on the mobile device (along with user-generated content). The system 700 includes a mobile device 705 (e.g., a mobile phone) coupled to a synchronization server platform 720. The mobile device 705 includes a backup client 709, an application datastore 707, and a multimedia content datastore 711. The synchronization server platform 720 includes a content delivery interface 721, an application/multimedia purchase and restore manager 723, user purchase history datastores 730, multimedia content/application mapping datastores 740, a user-generated content and application settings datastore 751, a multimedia content datastore 753, an application datastore 755, and synchronization server platform components 760.

In operation, when content is restored to the mobile device 705, the backup client 709 sends a request to restore data to the content delivery interface 721. The Application/Multimedia Purchase and Restore Manager 723 queries the user purchase history databases 730 to determine what the user has previously subscribed to (using the datastore 731) or purchased (using the datastores 733 and 735). The manager 723 also queries the multimedia content/application mapping datastores 740 to determine any equivalent content, and also generates new offers, if applicable. The content delivery interface 721 responds to the mobile device 705 with a list of content to be restored, including upgrades, updates, equivalents, and new offers, if any. The client 705 responds with a list of content to be restored. The platform 720 responds with user-generated content and applications settings (to ensure that the content is formatted for use on the mobile phone), as well as the multimedia content (from the datastore 753) and the application (from the datastore 755).

Preferably, the content-delivery interface 721 and the backup client communicate using HTTP. It will be appreciated, however, that other protocols such as HTTPS (HTTP Secure) and Secure Sockets Layer (SSL) can also be used.

Figure 15:
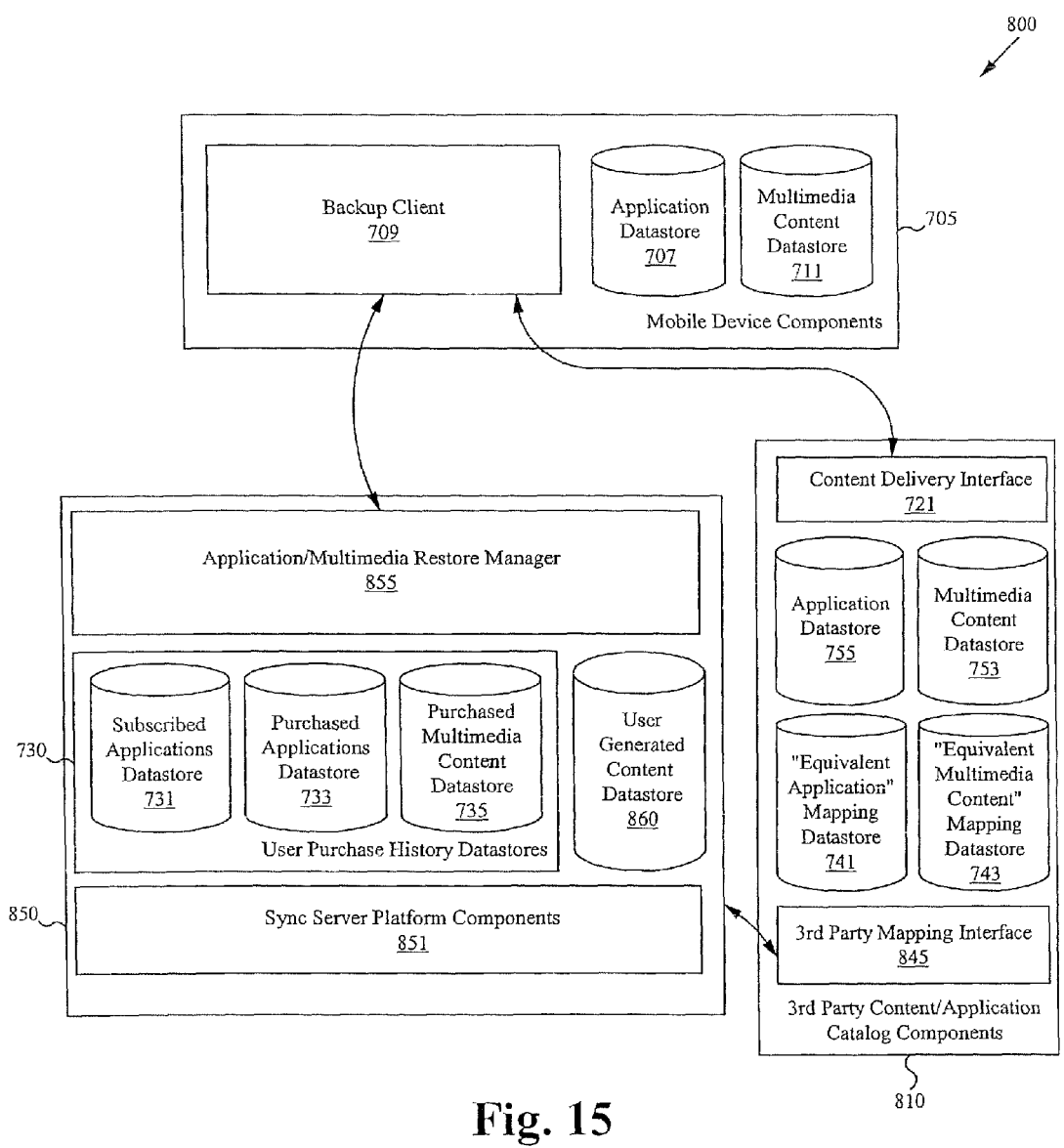
Figure 16:
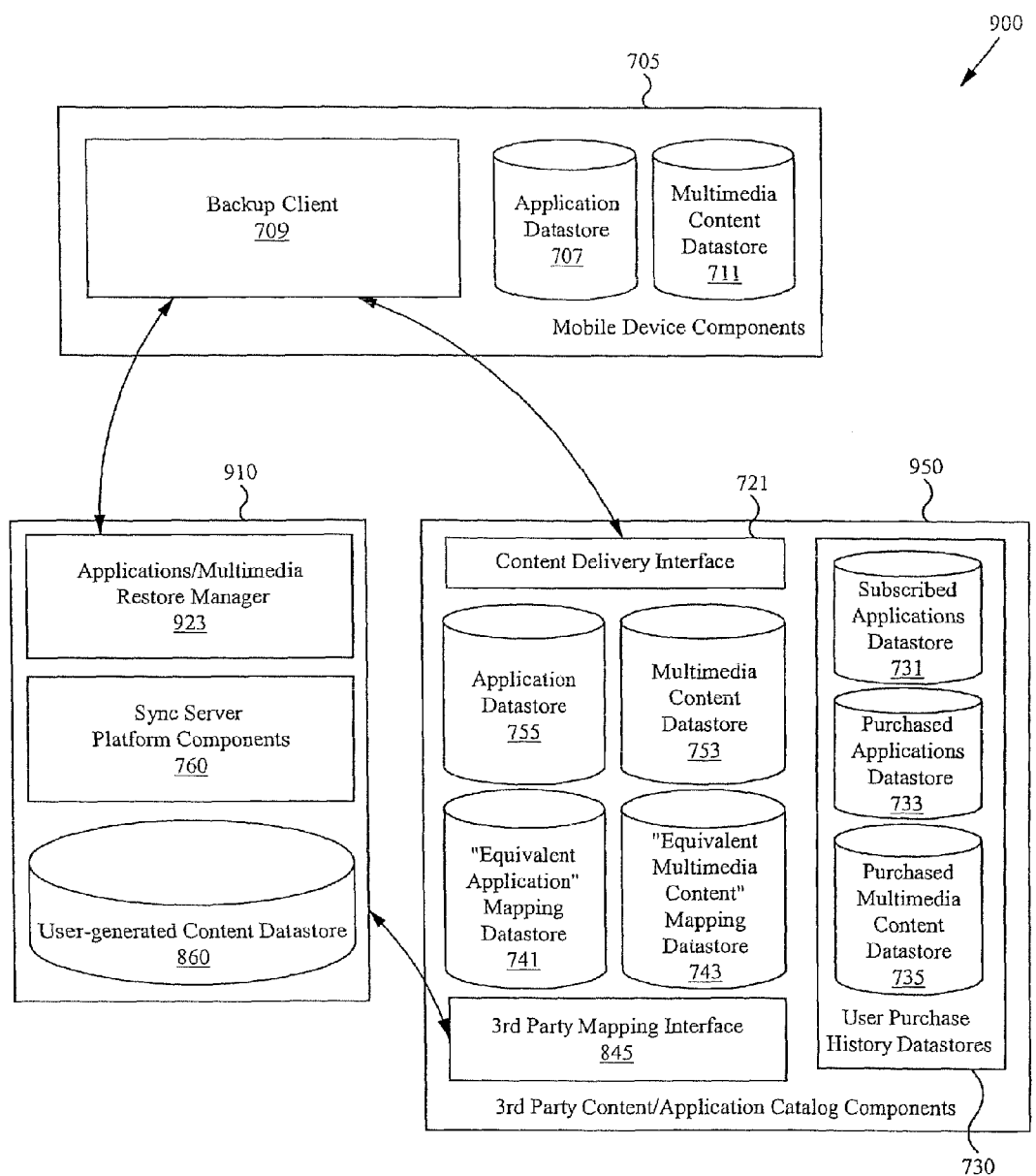
Figure 17:
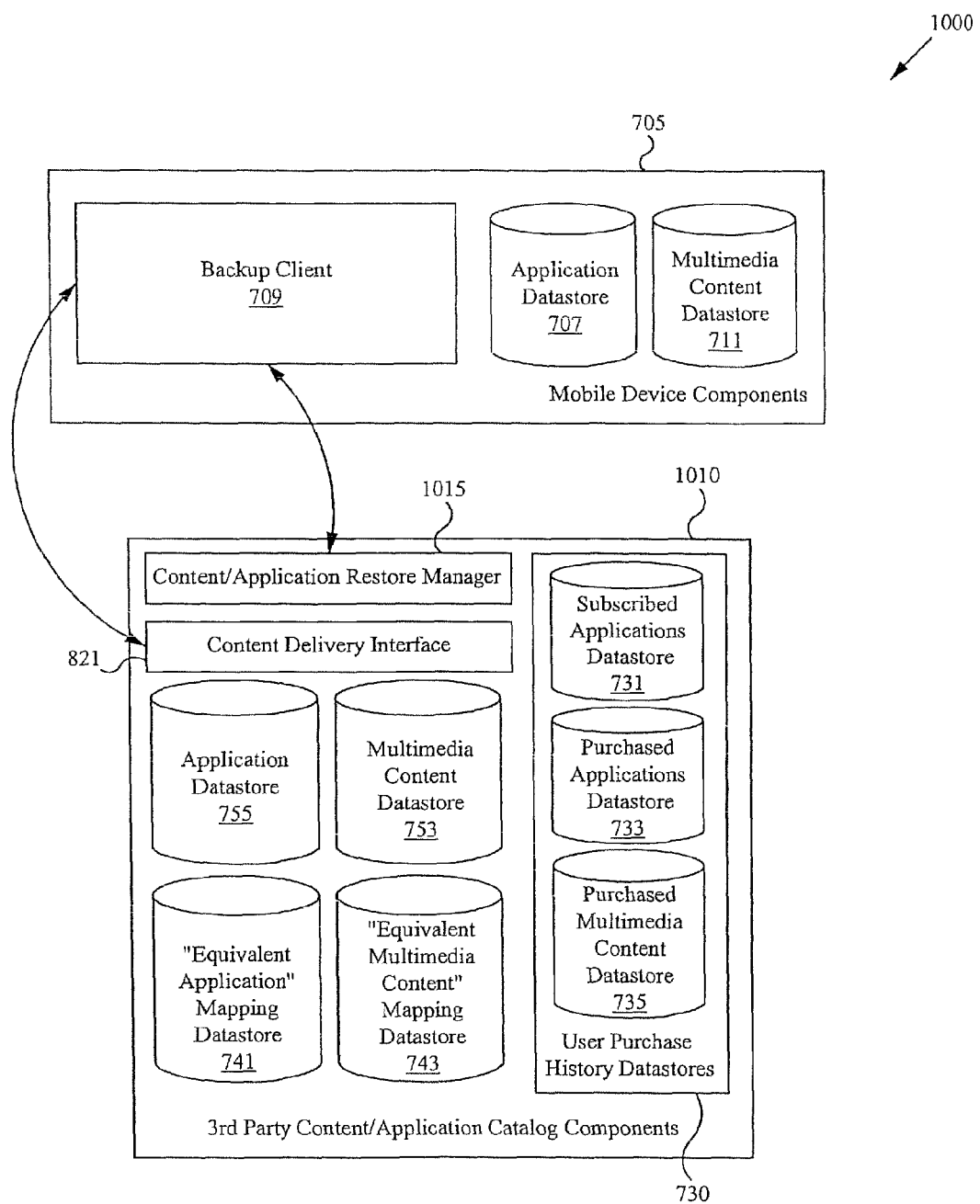

FIGS. 15-17 are high-level diagrams of backup and restore systems 800, 900, and 1000, respectively, in accordance with other embodiments of the present invention. Throughout this application, the same label refers to the same component. The systems 800, 900, and 1000 provide different levels of control over content among the mobile phone operators and the third-party content providers.

The system 800 in FIG. 15 includes the mobile device 705 coupled to a synchronization server platform 850 and third-party content/application catalog components 810. Preferably, the components 810 function similarly to the intermediate platform 110 of FIG. 1. In the system 800, the operator or original device manufacturer is able to maintain control of the applications and multimedia content and its delivery system, while relying on a synchronization server platform component 851 to control what is installed on the mobile device 705. The synchronization server platform 850 includes an application/multimedia restore manager 855, the synchronization server platform component 851, the user purchase history datastores 730, and a user-generated content datastore 860.

The third-party content/application catalog components 810 includes the content delivery interface 721, the application datastore 755, the multimedia content datastore 753, the "Equivalent Application" mapping datastore 741, the "Equivalent Multimedia Content" mapping datastore 743, and a third-party mapping interface 845.

As shown in FIG. 15, the client 709 is coupled to the application/multimedia restore manager 855 and the content delivery interface 721, preferably using an HTTP interface. The synchronization server 850 is coupled to the third-party mapping interface 845, also preferably using an HTTP interface. In this embodiment, a third-party controls equivalent mapping information.

In operation, the mobile device 705 communicates with the content delivery interface 721, which recognizes the mobile device 705 by the URL used to request content, such as described above. The components 810 store applications and multimedia (755 and 753), from which some requests for content can be satisfied. When content requested is not hosted on the components 810, the components 810 determine equivalent content, if any, using the mapping data stores 741 and 743, and then communicate with the synchronization server platform 850 using the third-party mapping interface 845. The synchronization server platform 850 responds by transmitting the requested content, or its equivalent, to the mobile device 705, such as described above.

FIG. 16 shows a system 900 for backing up content in accordance with another embodiment of the present invention. In the system 900, purchase information, application equivalency, and content delivery are all provided by a third party. The system 900 includes the mobile device 705 coupled to a platform 910 and a third-party content/application catalog of components 950. The third-party content/ application catalog of components 950 is similar to the catalog of components 810, except that the user purchase history datastores 730 is included on the catalog 950 but not on the catalog 810.

FIG. 17 shows a system 1000 for backing up content in accordance with another embodiment of the present invention. The system 1000 includes the mobile device 705 coupled to a third-party content/application catalog of components 1010. The third-party content/application catalog of components 1010 is similar to the catalog of components 950, except that third-party mapping interface 845 in FIG. 14 is replaced with a content/application restore manager 1015, which is coupled to the backup client 709.

Figure 18:
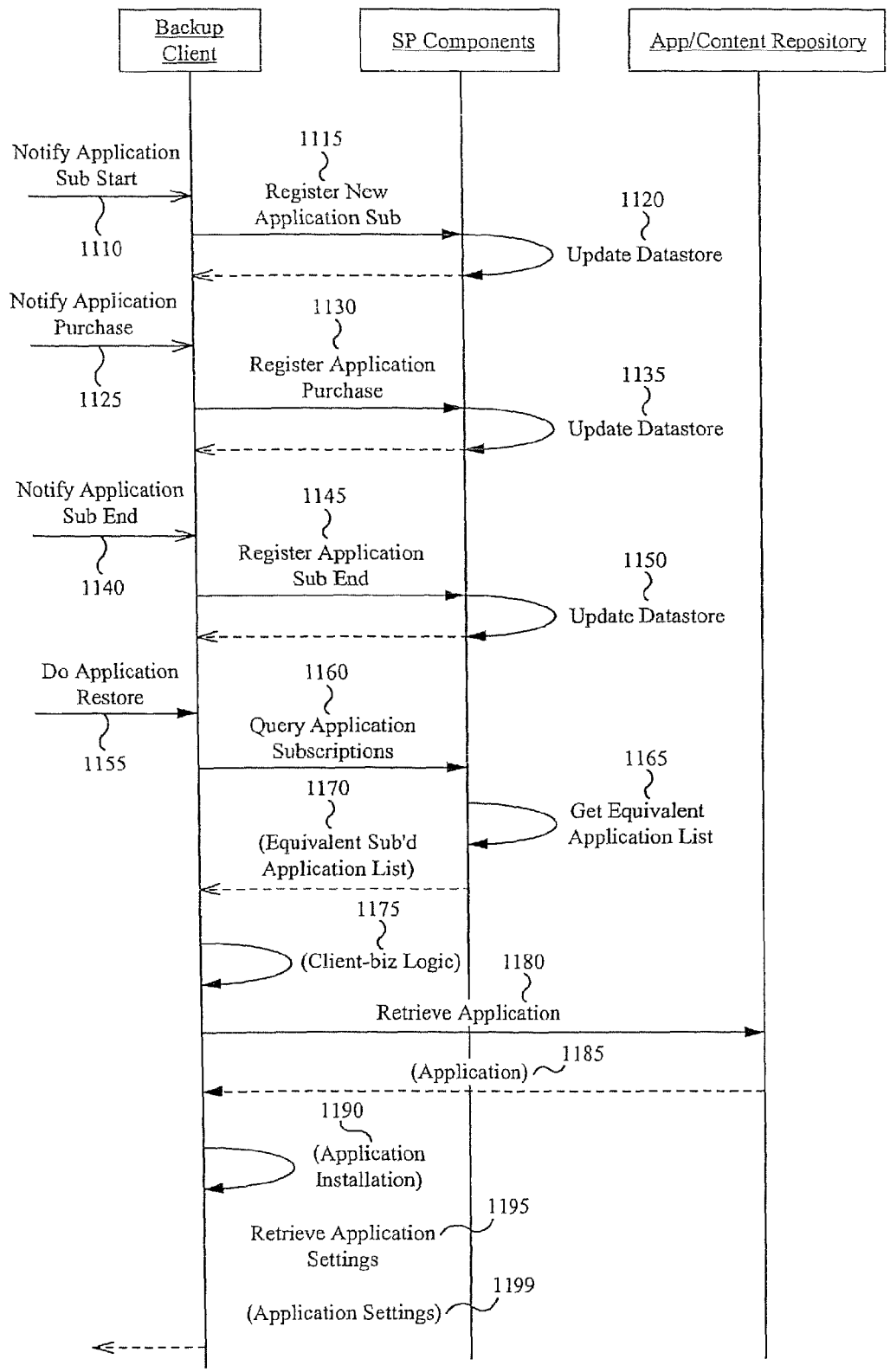
FIG. 18 is a sequence diagram for acquiring and restoring content in accordance with one embodiment of the present invention.

FIG. 18 is a sequence diagram 1100 of interactions between a mobile device client, a synchronization platform server, and a content repository in accordance with one embodiment of the invention. In the step 1110, the user starts a routine for acquiring (e.g., purchasing, licensing, taking a subscription to, etc.) content, and in the step 1115, the client communicates with the server to register the new application, thereby updating the appropriate application datastore in the step 1120. In the step 1125, the user selects to purchase the application, and in the step 1130, the client registers the purchased application on the server, thereby updating the application datastore in the step 1135. In the step 1140, the user indicates that she is done acquiring new content, and in the step 1145 the client notifies the server that the purchasing is complete. The datastore is updated in the step 1150.

Later, when the device is to be restored, such as when it has been deactivated and is to be reactivated, in the step 1155, the client notifies the server to restore the device. In the step 1160, the device sends a command to query the subscriptions that have been acquired for the device. In the step 1165, the server retrieves a list of subscribed applications, including equivalents, and returns this list to the client in the step 1170. In the step 1175, the client presents this list to the user, allowing her to select the content that she wants. In the step 1180, the client requests the applications (original, equivalent, upgrades, etc.), which are returned to the client in the step 1185. In the step 1190, the applications are installed on the device. In the step 1195, the mobile device requests the settings for the applications, which are retrieved in the step 1195 and installed on the device in the step 1199.

Querying Third-Party Content Providers

As discussed above, third-party content providers support a queryable interface, which allows the synchronization platform to retrieve, for a given user, a list of previously purchased content, metadata about items in the content catalog, equivalency data about previously purchased content, and a mechanism for retrieving equivalent content on a new handset.

The list of previously purchased content can include a unique identifier that the synchronization platform presents to the content provider on subsequent calls to these interfaces, which provides an instance of content (e.g., "Who Let The Dogs Out Ringtone in MP3 @ 128 kbps). Metadata can include information such as the name, description size, and format of a particular content item in the catalog. Equivalency data can include, given a previously purchased content ID, new content ID appropriate for a given BREW platform ID. A preferred mechanism for retrieving equivalent content includes an interface that returns an HTTP Uniform Resource Locator (URL) via which binary data can be retrieved. When this interface is accessed, a third-party content provider can apply any digital rights management (DRM) desired, such as the remaining number of downloads allowed. It will be appreciated that mechanisms other than HTTP are able to be used in accordance with the present invention.

Third-content providers are able to be queried in many ways. As one example, a third-party content provider is queried by accessing it using a URL that contains the query command. In this example, the URL contains a base URL path (here, "/la/f1cpi") and a string that includes an operation code, an operation version number, and a user telephone number. The URL has the general form:
https://address/baseURLpath/
cpi?op=operationcode&v=versionnumber&u=telephonenumber
where the address is the domain of the third-party content provider.

Thus, for example, if the address of the third-party content provider is "contentprovider.com," the query is to retrieve a list of user content purchased by the user (operationcode=1), the operation version is 1, and the user is identified by the telephone number 15555551212, then the querying URL is
https://contentprovider.com/al/
f1cpi?op=1&v=1&u=15555551212

Accessing the third-party content provider using the URL will return results such as a list of persistent, unique content instance identifiers.

In another example, the query is to retrieve content details such as metadata about a particular instance on content owned by a third-party content provider. In this example, the querying URL is given as:
https://contentprovider.com/al/
f1cpi?op=2&v=1&cid=A123897ADFAD
where the operation code is 1 and the operation version number is 1. The string A123897ADFAD is the content instance ID in question. Accessing the third-party content provider using this URL will display the returned results such as delimiter separated fields containing metadata about content instances such as content file name, content description, content size, content format description, content encoding description, and content author.

In a similar manner, using an appropriate operation code and associated parameters, a content portability interface can be queried to return a list of correct equivalent content and to return content URLs usable by the synchronization platform to download the appropriate version of a particular premium content item.

Content Migration

Figure 19A:
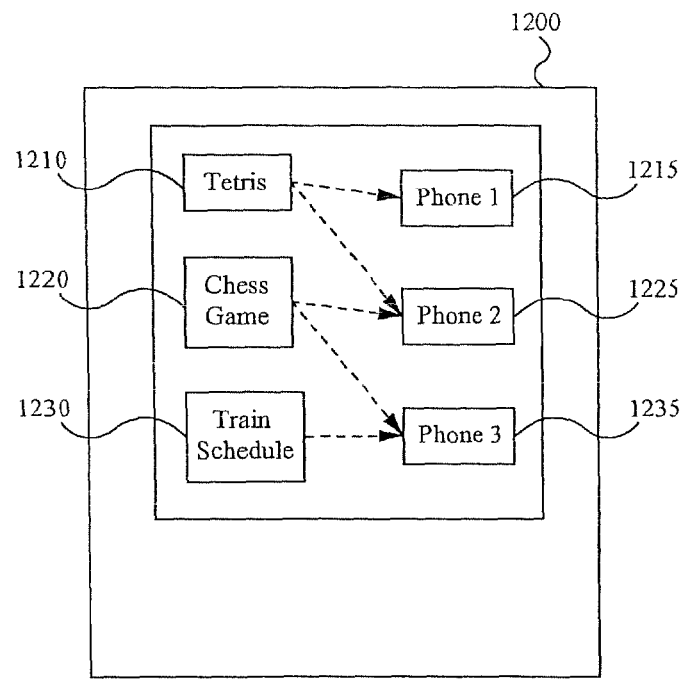
FIG. 19A shows an interface for selecting content and configuring one or more mobile phones to store the selected content, in accordance with one embodiment of the present invention.
Figure 19B:
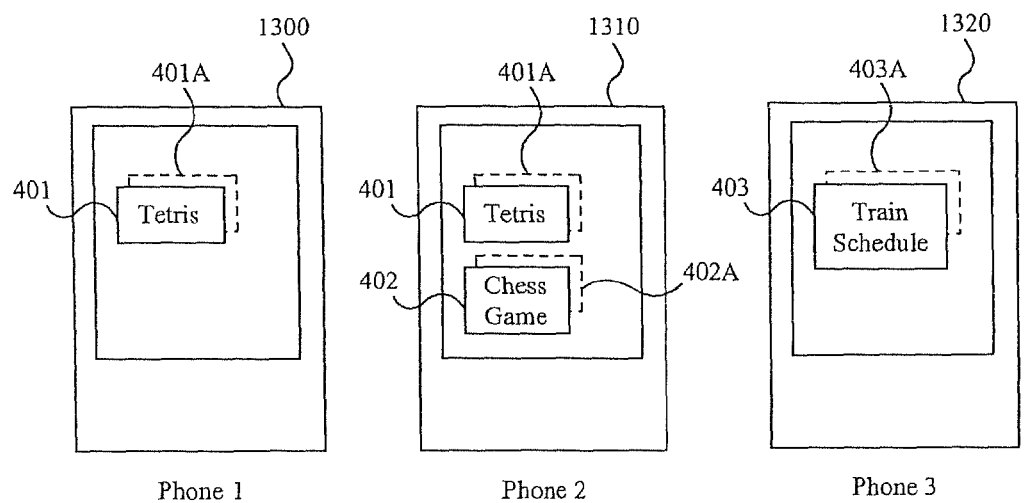
FIG. 19B shows the selected mobile phones of FIG. 17A, after being configured to store the selected content, in accordance with one embodiment of the present invention.

Embodiments of the present invention provide an interface for configuring or updating mobile devices to access content available to other mobile devices. FIG. 19A, for example, shows a system 1200 that displays icons 1210, 1220, and 1230, corresponding to Tetris, a Chess game, and a Train schedule application, respectively, and icons 1215, 1225, and 1235, corresponding to a first mobile phone (Mobile phone 1), a second mobile phone (Mobile phone 2), and a third mobile phone (Mobile phone 3). As shown on FIG. 19A, by the dotted lines, the icon 1210 is dragged and dropped to the icon 1215, the icon 1220 is dragged and dropped to the icon 1225, and the icon 1230 is dragged and dropped to the icon 1235. The result of this is that a link to the game Tetris on a content provider (e.g., a URL), such as described above, is stored on the mobile phone 1. As shown in FIG. 19B, the icon to the Tetris 401 and the corresponding link 401A are stored on the Mobile phone 1 and the Mobile phone 2, such as shown in FIG. 9. Similarly, an icon to the Chess game 402 and its associated link are also stored on the Mobile phone 2, and an icon to the Train schedule application 403 and its associated link 403A are stored on the Mobile phone 3. Preferably, the icons 401-403 and the associated links 401A-403A are transmitted to the Mobile phones 1-3 wirelessly.

In one embodiment, the system 1200 is programmed to receive icons and associated links from any one of the Mobile phones 1-3. As one example, the system 1200 receives an icon and related link from the Mobile phone 1. The icon is then displayed on the system 1200, alone or in a list of other icons. The icon and associated link are then selected and transferred to the Mobile phones 2 and 3, as discussed above.

It will also be appreciated that while the system 1200 is programmed to transfer content to mobile phones, the system 1200 can also be used to offer new content for the Mobile phones 1-3. These new offers can be based on previous acquisitions for any one or more of the Mobile phones 1-3, such as found in purchase history databases discussed above. The system 1200 can be programmed to offer content, list prices for content, and transmit content to mobile phones. In accordance with one embodiment, links to content are automatically and periodically transferred from one mobile device to another so that the two are synchronized.

In operation, links to content are stored on a platform remote to a mobile phone. When content is to be restored on the mobile, the mobile phone communicates with a platform that associates the content with one or more content providers. The platform contacts the one or more content providers, which directly transmit the content to the mobile phone. Replacement content, such as upgrades, equivalent content, related content, and the like, can be offered to the mobile phone user, who can then select the replacement content, for a regular fee, a reduced fee, or even for no fee. Replacement content can be determined from a history of the user's past purchases, which is stored and used for this purpose.

In the operation of other embodiments, a link to content is stored on the mobile phone; when an icon on the mobile phone is selected, the mobile phone communicates directly with the content provider, which transmits the content to the mobile phone. In the operation of still other embodiments, links to content are stored on a central device and transmitted to selected mobile phones. In this way, a mobile phone can be configured so that it can access content previously accessible to another mobile phone.

It will be appreciated that while many of the examples included in this application refer to mobile phones, other electronic devices are able to use embodiments of the present invention including, but not limited to, personal digital assistants and personal computers.

It will be readily apparent to one skilled in the art that various modifications may be made to the embodiments without departing from the spirit and scope of the invention as defined by the appended claims.

We claim:

1. A content management system for a mobile device comprising:
   a content server comprising a non-transitory computer-readable medium that stores content;
   a delivery interface programmed to communicate with and transfer the content from the content server to the mobile device using an HTTP protocol, wherein the delivery interface is programmed to transfer the content from the content server to the mobile device by using a link to the content and parsing metadata from the link to determine the source of the content, wherein the link is externally stored from the mobile device and the content server; and an intermediary server configured to communicatively couple with the mobile device and to recognize the mobile device as being an upgrade of another device that is different from the mobile device, wherein the intermediary server comprises a non-transitory computer-readable medium that stores one or more user records associated with a user of the mobile device, wherein each of the one or more user records corresponds to data previously acquired by the user, wherein when the content transferred from the content server to the mobile device is equivalent to previously acquired content for the another device, the intermediary server receives update information from the content server for updating the one or more user records, and wherein the intermediary server maintains a mapping database that maps the equivalent content to the previously acquired content, wherein the equivalent content is suitable to operate on the mobile device but not on the another device, and the previously acquired content is suitable to operate on the another device but not on the mobile device.

2. The system of claim 1, wherein the content comprises a mobile application program, a mobile ring tone, a mobile wallpaper, video data, audio data, digital images, a ring back tone, or a combination of these.

3. The system of claim 1, further comprising a data store of acquired content.

4. The system of claim 1, further comprising an interface programmed to receive content from one or more sources.

5. The system of claim 4, wherein the interface is also programmed to poll the one or more sources to determine content that has been acquired for the mobile device from the one or more sources.

6. The system of claim 4, further comprising a parser for parsing the one or more user records which determines the one or more sources.

7. The system of claim 4, wherein the one or more sources are third-party content providers.

8. The system of claim 4, wherein the interface comprises a connection module for connecting to sources using Uniform Resource Indicators to the one or more sources.

9. The system of claim 4, further comprising an offer module for generating offers for replacement content on the mobile device.

10. The system of claim 9, wherein the offer module is programmed to transmit data associated with the offers to the mobile device and the mobile device is programmed to display and select the offers.

11. The system of claim 10, wherein the offer module is also programmed to generate the offers from a history of acquisitions for one or more entities.

12. The system of claim 11, wherein the one or more entities comprise a user.

13. The system of claim 11, wherein the one or more entities comprise a mobile phone.

14. The system of claim 4, further comprising a metadata store containing metadata about content.

15. The system of claim 14, wherein the metadata comprises information indicating a manufacturer of a mobile device, a version of a mobile device, operating capabilities of the mobile device, or any combination of these.

16. The system of claim 15, wherein the operating capabilities comprise a screen size, a number of pixels, or both.

17. The system of claim 4, further comprising a Web-based interface coupled to a content manager and programmed to manage the content.

18. The system of claim 4, further comprising:
a multimedia content data store;
a user-generated content data store; and
an application data store.

19. The system of claim 4, wherein the mobile device comprises a mobile telephone, a personal digital assistant, or a personal computer, wherein the content is removed from the mobile device when an application associated with the content is closed on the mobile device.

20. The system of claim 1, wherein the content comprises user-generated content.

21. The system of claim 20, wherein the user-generated content comprises one of an address book, pictures, video, and sound recordings.

22. The system of claim 21, further comprising a content aggregator configured to poll a provider of content acquired by the mobile device to determine whether the content provider contains content associated with the mobile device.

23. The system of claim 1, further comprising an acquisition history module configured to store records associating content acquired by the mobile device with an identifier of the mobile device.

24. The system of claim 23, wherein a record comprises a link to a content provider that provided the content acquired.

25. The system of claim 24, wherein the record further comprises information identifying the content acquired.

26. The system of claim 25, wherein when the system transfers content to the mobile device, the system is configured to utilize the information identifying the content to determine whether replacement content is available.

27. The system of claim 26, wherein the system offers the equivalent content to the mobile device prior to transfer of the equivalent content to the mobile device.

28. The system of claim 26, wherein equivalent content comprises content the same as the acquired content and having a higher version number.

29. The system of claim 23, wherein the record further comprises information to determine the mobile device operating capabilities with respect to the acquired content, and wherein the update information sent from the content server indicates that the equivalent content is to replace the previously acquired content.

30. The system of claim 29, wherein a content provider transcodes the content prior to transfer to the mobile device, wherein transcoding comprises one of resizing, reformatting, and encoding the content into a different coding scheme.

31. The system of claim 1, wherein the link to the content is known to the mobile device.

32. The system of claim 1, wherein intermediary server provides offers for similar content that is similar to the content.

33. The system of claim 1, wherein the equivalent content is not an upgraded version of the content.

34. The system of claim 1, wherein the content server maintains an acquisition history of the user for the mobile device and supports a queryable interface, wherein the queryable interface retrieves, for the user, information based on the acquisition history, and wherein when the queryable interface is accessed, the content server applies a digital rights management (DRM).

35. The system of claim 1, wherein the intermediary server includes the delivery interface.

* * * * *